United States Patent
Tsujimoto et al.

(10) Patent No.: US 6,300,450 B1
(45) Date of Patent: Oct. 9, 2001

(54) CONJUGATED DIENE COMPOUND POLYMERIZATION CATALYST PROCESS FOR THE PREPARATION OF CONJUGATED DIENE POLYMER IN THE PRESENCE THEREOF AND POLYBUTADIENE THUS PREPARED

(75) Inventors: Nobuhiro Tsujimoto; Koji Maeda; Masato Murakami; Michinori Suzuki; Yasumasa Iwamoto; Sakae Yuasa; Satoshi Bandai; Yoshihira Hosoyama; Nobuharu Hisano, all of Chiba (JP)

(73) Assignee: UBE Industries, Ltd., Yamaguchi (JP)

( * ) Notice: Subject to any disclaimer, the term of this patent is extended or adjusted under 35 U.S.C. 154(b) by 0 days.

(21) Appl. No.: 09/197,085

(22) Filed: Nov. 19, 1998

(30) Foreign Application Priority Data

Nov. 25, 1997 (JP) .................................................... 9-322543
Jul. 3, 1998 (JP) .................................................. 10-188943
Aug. 25, 1998 (JP) .................................................. 10-238990

(51) Int. Cl.$^7$ ................................................... C08F 36/00
(52) U.S. Cl. ...................... 526/335; 526/160; 526/943; 526/80; 526/91; 526/151; 526/158; 502/152
(58) Field of Search ............................ 502/152; 526/160, 526/943, 335, 80, 91, 151, 158

(56) References Cited

FOREIGN PATENT DOCUMENTS 0 308 177 A1    3/1989   (EP) .
0778291 A1   *  6/1997   (EP) .
0 778 291 A1    6/1997   (EP) .

OTHER PUBLICATIONS

Tait, Polymeric Materials Encyclopedia, edited by J.C. Salamone, vol. 6, CRC. 1996*

* cited by examiner

Primary Examiner—David W. Wu
Assistant Examiner—Ling-Siu Choi
(74) Attorney, Agent, or Firm—Akin, Gump, Strauss, Hauer & Feld, L.L.P.

(57) ABSTRACT

The present invention provides a process for the production of a conjugated diene polymer having a controlled microstructure at a high polymerization activity in the presence of a metallocene type complex of compound of transition metal of the group V of the Periodic Table. A novel catalyst is provided comprising (A) a metallocene type complex of a transition metal of the group V of the Periodic Table, (B) an ionic compound of a non-coordinating anion and a cation, (C) an organic metal compound of the groups I to III and (D) water, wherein the molar ratio of (C)/(D) is from 0.66 to 5. A novel process for the production of a conjugated diene polymer is also provided, which comprises the polymerization of a conjugated diene compound in the presence of a catalyst comprising (A) a metallocene type complex of a transition metal of the group V of the Periodic Table, (B) an ionic compound of a non-coordinating anion and a cation, (C) an organic metal compound of the groups I to III and (D) water, wherein the molar ratio of (C)/(D) is from 0.66 to 5.

15 Claims, No Drawings

CONJUGATED DIENE COMPOUND POLYMERIZATION CATALYST PROCESS FOR THE PREPARATION OF CONJUGATED DIENE POLYMER IN THE PRESENCE THEREOF AND POLYBUTADIENE THUS PREPARED

FIELD OF THE INVENTION

The present invention relates to a catalyst for the polymerization of conjugated diene compound. More particularly, the present invention relates to a process for the preparation of a polybutadiene having a controlled microstructure. Even more particularly, the present invention relates to a polybutadiene having a controlled microstructure and a high molecular linearity.

BACKGROUND OF THE INVENTION

It is known that when a conjugated diene is polymerized in the presence of a polymerization catalyst, polymers having various microstructures can be obtained. A process for the preparation of a polybutadiene having a high cis-structure from a cobalt compound and an organic aluminum compound is known. A polybutadiene having a high cis-structure comprising 1,2-structure incorporated therein in a proper amount is expected to act as an impact modifier for vinyl aromatic polymer.

In recent years, the development of various olefins using a metallocene type complex as a catalyst has been actively under way. The polymerization of conjugated dienes has been studied as well.

Referring to the polymerization of conjugated dienes in the presence of metallocene type complex, a catalyst system made of cyclopentadienyl titanium trichloride ($CpTiCl_3$) as a compound of transition metal of the group IV of the Periodic Table and methyl alumoxane is proposed in *Macromol. Symp.*, vol. 89, p. 383 (1995), etc. However, the catalyst is disadvantageous in that it has a low polymerization activity.

JP-B-46-20494 (The term "JP-B" as used herein means an "examined Japanese patent publication") discloses a process for the preparation of a polybutadiene in the presence of a catalyst system made of $CpVCl_3+(i-C_4H_9)_3Al/AlCl_3+H_2O$. However, this catalyst system is disadvantageous in that it has a low polymerization activity.

A process for the preparation of a polybutadiene having a high cis-structure comprising 1,2-structure incorporated therein in a proportion of from 10 to 20% using a catalyst made of a vanadium (III) compound such as metallocene type complex of transition metal of the group V of the Periodic Table (e.g., $CpVCl_2 \cdot (PEt_3)_2$, $Cp_2VCl$) and methyl alumoxane is reported in *Polymer*, vol. 37 (2), p. 363 (1996).

Further, JP-A-9-202813 and JP-A-9-194526 (The term "JP-A" as used herein means an "unexamined published Japanese patent application") disclose a process for the preparation of a polybutadiene in the presence of a catalyst system made of a vanadium metallocene compound having a specific structure and an ionizing agent.

Moreover, EP 0778291A1 discloses a catalyst comprising:

(A) a compound of a transition metal of the group V of the Periodic Table represented by the following general formula:

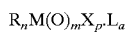

wherein M represents a transition metal of the group V of the Periodic Table; R represents a cyclopentadienyl group, a substituted cyclopentadienyl group, an indenyl group, a substituted indenyl group, a fluorenyl group or a substituted fluorenyl group; O represents an oxygen atom; X represents a hydrogen atom, a halogen atom, a hydrocarbon group having 1 to 20 carbon atoms, an alkoxy group, an aryloxy group or an amido group; L represents a Lewis basic compound; n, m, and p each represent an integer selected to make a combination of (n=1, m=1, p=2), (n=1, m=0, p=3), (n=2, m=o, p=1) or (n=1, m=0, p=2); and a represents 0, 1 or 2, and (B) at least one of (B1) an ionic compound comprising a non-coordinating anion and a cation and (B2) an aluminoxane, provided that said component (B) is an ionic compound comprising a non-coordinating anion and a cation (B1) when the combination of n, m, and p of said component (A) is (n=2, m=0, p=1) or (n=1, m=0, p=2).

A polybutadiene has a so-called microstructure comprising a connection moiety produced by polymerization at the 1- and 4-positions (1,4-structure) and a connection moiety produced by polymerization at the 1- and 2-positions (1,2-structure) present in combination in its molecular chain. The 1,4-structures are classified into two types, i.e., cis-structure and trans-structure. On the other hand, the 1,2-structure comprises vinyl group as a side chain.

It is known that polybutadienes having different microstructures can be prepared depending on the kind of polymerization catalysts used. These polybutadienes are used for various purposes depending on their properties.

In particular, a polybutadiene having a microstructure comprising a high cis-structure having 1,2-structure incorporated therein in a proper amount and hence little trans-structure and a high molecular linearity has excellent properties such as high abrasion resistance, high heat generation resistance and high impact resilience.

JP-B-53-44188 discloses an impact-resistant polystyrene made of a polybutadiene having a 1,2-structural unit content of from 15 to 35%, a cis-1,4-structural unit content of from 20 to 85% and a 5% styrene solution viscosity (5% SV) of from 50 to 200 cps, provided that 5% styrene solution viscosity (5% SV) satisfies the relationship: $1.5ML_{1+4} \leq 5\%$ styrene solution viscosity $(5\% SV) \leq 3ML_{1+4}$ In general, 5% SV and Tcp have the relationship 5% SV=Tcp×1.345. Accordingly, a formulation $1.12 \leq Tcp/ML_{1+4} \leq 2.23$ is given.

SUMMARY OF THE INVENTION

It is therefore an object of the present invention to provide a process for the preparation of a conjugated diene polymer having a controlled microstructure at a high polymerization activity in the presence of a catalyst system made of a metallocene type complex of a compound of transition metal of the group V of the Periodic Table.

It is another object of the present invention to provide a process for the preparation of a polybutadiene having a microstructure comprising a high cis-structure having 1,2-structure incorporated therein in a proper amount and hence little trans-structure at a high activity.

It is a further object of the present invention to provide a polybutadiene having a microstructure and a high molecular linearity.

These and other objects of the present invention will become more apparent from the following detailed description and examples.

The present invention concerns the following constitutions:

(1) A catalyst comprising (A) a metallocene type complex of a transition metal of the group V of the Periodic table, (B) an ionic compound of a non-coordinating anion and a cation, (C) an organic metal compound of an element of the groups I to III of the Periodic Table and (D) water, wherein the molar ratio of (C)/(D) is from 0.66 to 5.

(2) The catalyst according to Clause (1), wherein said metallocene type complex of a transition metal of the group V of the Periodic table (A) is a compound represented by the following general formula:

$$RMX_3 \cdot L_a$$

wherein R represents a cyclopentadienyl group, a substituted cyclopentadienyl group, an indenyl group, a substituted indenyl group, a fluorenyl group or a substituted fluorenyl group; M represents a compound of the group V transition metal; X represents a hydrogen atom, a halogen atom, a $C_{1-20}$ hydrocarbon group, an alkoxyl group or an amino group; L represents a Lewis base; and a represents 0, 1 or 2.

(3) The catalyst according to Clause (1), wherein said metallocene type complex of a transition metal of the group V of the Periodic table (A) is a compound represented by the following general formula:

$$RM \cdot L_a$$

wherein R represents a cyclopentadienyl group, a substituted cyclopentadienyl group, an indenyl group, a substituted indenyl group, a fluorenyl group or a substituted fluorenyl group; M represents a compound of the group V transition metal; L represents a Lewis base; and a represents 0, 1 or 2.

(4) The catalyst according to any one of Clauses (1) to (3), wherein said transition metal of the group V of the Periodic table is vanadium.

(5) The catalyst according to any one of Clauses (1) to (4), wherein said element of the groups I to III of the Periodic table is aluminum.

(6) A process for the preparation of a conjugated diene polymer, which comprises polymerizing a conjugated diene compound in the presence of a catalyst defined in any one of Clauses (1) to (5).

(7) The process for the preparation of a conjugated diene polymer according to Clause (6), wherein the polymerization of a conjugated diene compound is effected in the presence of hydrogen.

(8) The process for the preparation of a conjugated diene polymer according to Clause (6) or (7), wherein the polymerization of a conjugated diene compound is carried out by bulk polymerization.

(9) The process for the preparation of a conjugated diene polymer according to Clause (6) or (7), wherein the polymerization of a conjugated diene compound is effected in an aromatic compound as a solvent.

(10) The process for the preparation of a conjugated diene polymer according to Clause (6) or (7), wherein the polymerization of a conjugated diene compound is effected in an aliphatic compound as a solvent.

(11) The process for the preparation of a conjugated diene polymer according to Clause (6) or (7), wherein the polymerization of a conjugated diene compound is effected in 2-butene as a solvent.

(12) The process for the preparation of a conjugated diene polymer according to any one of Clauses (8) to (11), wherein said conjugated diene compound is a conjugated diene compound mainly composed of butadiene.

(13) The process for the preparation of a conjugated diene polymer according to Clause (12), wherein said organic metal compound of the groups I to III of the Periodic table (C) and said water (D) have previously been allowed to come in contact with each other.

(14) The process for the preparation of a conjugated diene polymer according to Clause (12), wherein said molar ratio of (C)/(D) is from 0.7 to 1.5.

(15) The process for the preparation of a conjugated diene polymer according to Clause (12), wherein the polymerization is preceded by the contact with catalyst components at a temperature of not higher than 40° C. for 1 to 60 minutes.

(16) A polybutadiene obtained by the process for the preparation of a conjugated diene polymer according to Clause (12), wherein the content of 1,2-structure unit, cis-1,4-structure unit and trans-1,4-structure unit in the butadiene monomer unit are from 4 to 30 mol-%, from 65 to 95 mol-% and not more than 5 mol-%, respectively, and the ratio ($T_{cp}/ML_{1+4}$) of toluene solution viscosity ($T_{cp}$) to Mooney viscosity at 100° C. ($ML_{1+4}$) is from 2 to 6.

DETAILED DESCRIPTION OF THE INVENTION

Examples of the metallocene type complex of a compound of transition metal of the group V of the Periodic Table include compounds represented by the following general formulae:

$$RM \cdot L_a \quad (1)$$

$$R_n MX_{2-n} \cdot L_a \quad (2)$$

$$R_n MX_{3-n} \cdot L_a \quad (3)$$

$$RMX_3 \cdot L_a \quad (4)$$

$$RM(O)X_2 \cdot L_a \quad (5)$$

$$R_n MX_{3-n}(NR') \quad (6)$$

In the formulae, n represents 1 or 2; and a represents 0, 1 or 2.

M represents a transition metal of the group V of the Periodic Table. Specific examples of the transition metal include vanadium (V), niobium (Nb), and tantalum (Ta). Preferred among these transition metals is vanadium.

R represents a cyclopentadienyl group, a substituted cyclopentadienyl group, an indenyl group, a substituted indenyl group, a fluorenyl group or a substituted fluorenyl group.

Examples of substituents on the substituted cyclopentadienyl group, substituted indenyl group or substituted fluorenyl group include a straight-chain aliphatic hydrocarbon group or branched aliphatic hydrocarbon group such as methyl, ethyl, propyl, iso-propyl, n-butyl, iso-butyl, sec-butyl, t-butyl and hexyl, an aromatic hydrocarbon group such as phenyl, tolyl, naphthyl and benzyl, and a hydrocarbon group having silicon atom such as trimethylsilyl. Further examples of the substituted cyclopentadienyl group include those comprising cyclopentadienyl ring connected to part of X with a crosslinking group such as dimethylsilyl, dimethyl methylene, methyl phenyl methylene, diphenyl methylene, ethylene and substituted ethylene.

Specific examples of the substituted cyclopentadienyl group include methyl cyclopentadienyl group, 1,2-dimethyl cyclopentadienyl group, 1,3-dimethyl cyclopentadienyl group, 1,3-di(t-butyl)cyclopentadienyl group, 1,2,3-trimethyl cyclopentadienyl group, 1,2,3,4-tetramethyl cyclopentadienyl group, pentamethyl cyclopentadienyl group, 1-ethyl-2,3,4,5-tetramethyl cyclopentadienyl group, 1-benzyl-2,3,4,5-tetramethyl cyclopentadienyl group, 1-phenyl-2,3,4,5-tetramethyl cyclopentadienyl group, 1-trimethylsilyl-2,3,4,5-tetramethyl cyclopentadienyl group, and 1-trifluoromethyl-2,3,4,5-tetramethyl cyclopentadienyl group.

Specific examples of the substituted indenyl group include 1,2,3-trimethyl indenyl group, heptamethyl indenyl group, and 1,2,4,5,6,7-hexamethyl indenyl group.

Specific examples of the substituted fluorenyl group include methyl fluorenyl group.

Preferred among groups represented by R are cyclopentadienyl group, methyl cyclopentadienyl group, pentamethyl cyclopentadienyl group, indenyl group, and 1,2,3-trimethyl indenyl group.

X represents a hydrogen atom, a halogen atom, a $C_{1-20}$ hydrocarbon group, an alkoxy group or an amino group. X's may be the same or different.

Specific examples of the halogen atom include fluorine atom, chlorine atom, bromine atom, and iodine atom.

Specific examples of the $C_{1-20}$ hydrocarbon group include a straight-chain aliphatic hydrocarbon group or branched aliphatic hydrocarbon group such as methyl, ethyl, propyl, iso-propyl, n-butyl, iso-butyl, sec-butyl, t-butyl and hexyl, and an aromatic hydrocarbon group such as phenyl, tolyl, naphthyl and benzyl. Further examples of the $C_{1-20}$ hydrocarbon group include a hydrocarbon group having silicon atom such as trimethylsilyl. Preferred among these $C_{1-20}$ hydrocarbon groups are methyl, benzyl, and trimethylsilylmethyl.

Specific examples of the alkoxy group include methoxy, ethoxy, phenoxy, propoxy, and butoxy. Further examples of the alkoxy group include amyloxy, hexyloxy, octyloxy, 2-ethylhexyloxy, and thiomethoxy.

Specific examples of the amino group include dimethylamino, diethylamino, and diisopropylamino.

Preferred among these groups represented by X are hydrogen atom, fluorine atom, chlorine atom, bromine atom, methyl, ethyl, butyl, methoxy, ethoxy, dimethylamino, and diethylamino.

L represents a Lewis base or normal Lewis basic inorganic or organic compound which can be coordinated to metal. Particularly preferred among these compounds is a compound free of active hydrogen. Specific examples of such a compound include ether, ester, ketone, amine, phosphine, olefin, diene, aromatic hydrocarbon, alkyne, and silyloxy compound.

NR' represents an imide group. R' represents a $C_{1-25}$ hydrocarbon substituent. Specific examples of the $C_{1-25}$ hydrocarbon substituent include a straight-chain aliphatic hydrocarbon group or branched aliphatic hydrocarbon group such as methyl, ethyl, propyl, iso-propyl, sec-butyl, t-butyl, hexyl, octyl and neopentyl, and an aromatic hydrocarbon group such as phenyl, tolyl, naphthyl, benzyl, 1-phenylethyl, 2-phenyl-2-propyl, 2,6-dimethylphenyl and 3,4-dimethylphenyl. Further examples of the $C_{1-25}$ hydrocarbon group include a hydrocarbon group having silicon atom such as trimethylsilyl.

Examples of the metallocene type complex of a compound of transition metal of the group V of the Periodic Table include compounds represented by the following general formulae:

$$RM.L_a \quad (1)$$

$$R_nMX_{2-n}.L_a \quad (2)$$

$$R_nMX_{3-n}.L_a \quad (3)$$

$$RMX_3.L_a \quad (4)$$

$$RM(O)X_2.L_a \quad (5)$$

$$R_nMX_{3-n}(NR') \quad (6)$$

Preferred among these compounds are vanadium compounds represented by the foregoing general formulae where M is vanadium, e.g., $RV.L_a$, $RVX.L_a$, $R_2V.L_a$, $RVX_2.L_a$, $R_2VX.L_a$, $RVX_3.L_a$, $RV(O)X_2$, $RV(NR')X_2$. Particularly preferred among these compounds are vanadium compounds such as $RV.L_a$ and $RVX_3.L_a$.

Specific examples of the compound represented by $RMX_3$ include the following compounds (i) to (xvi):

(i) Cyclopentadienyl vanadium trichloride

Examples of cyclopentadienyl vanadium trichloride include mono-substituted cyclopentadienyl vanadium trichloride such as methyl cyclopentadienyl vanadium trichloride, ethyl cyclopentadienyl vanadium trichloride, propyl cyclopentadienyl vanadium trichloride, isopropyl cyclopentadienyl vanadium trichloride, t-butyl cyclopentadienyl vanadium trichloride, (1,1-dimethylpropyl) cyclopentadienyl vanadium trichloride, (benzyl cyclopentadienyl)vanadium trichloride, (1,1-dimethylbenzyl)cyclopentadienyl vanadium trichloride, (3-pentyl)cyclopentadienyl vanadium trichloride, (3-methyl-3-pentyl)cyclopentadienyl vanadium trichloride, (diethylbenzyl)cyclopentadienyl vanadium trichloride, and (trimethylsilylcyclopentadienyl) vanadium trichloride.

(iia) 1,2-di-substituted cyclopentadienyl vanadium trichloride

Examples of 1,2-di-substituted cyclopentadienyl vanadium trichloride include (1,2-dimethylcyclopentadienyl) vanadium trichloride, (1-ethyl-2-methylcyclopentadienyl) vanadium trichloride, (1-methyl-2-propylcyclopentadienyl) vanadium trichloride, (1-methyl-2-trimethylsilylcyclopentadienyl)vanadium trichloride, (1,2-bis(trimethylsilyl)cyclopentadienyl)vanadium trichloride, (1-methyl-2-bis(trimethylsilyl)methylcyclopentadienyl)vanadium trichloride, (1-methyl-2-phenylcyclopentadienyl)vanadium trichloride, (1-methyl-2-tolylcyclopentadienyl)vanadium trichloride, (1-methyl-2-(2,6-dimethylphenyl) cyclopentadienyl)vanadium trichloride, and (1-butyl-2-methylcyclopentadienyl)vanadium trichloride.

(iib) 1,3-di-substituted cyclopentadienyl vanadium trichloride

Examples of 1,3-di-substituted cyclopentadienyl vanadium trichloride include (1,3-dimethylcyclopentadienyl) vanadium trichloride, (1-ethyl-3-methylcyclopentadienyl) vanadium trichoride, (1-methyl-3-propylcyclopentadienyl) vanadium trichloride, (1-methyl-3-trimethlsilylcyclopentadienyl)vanadium trichloride, (1,3-bis(trimethylsilyl) cyclpentadienyl) vanadium trichloride, (1-methyl-3-bis(trimethylsilyl)methylcyclopentadienyl) vanadium trichloride, (1-methyl-3-phenylcyclopentadienyl) vanadium trichloride, (1-methyl-3-tolylcyclopentadienyl) vanadium trichloride, (1-methyl-3-(2,6-dimethylphenyl) cyclopentadienyl)vanadium trichloride, and (1-butyl-3-methylcyclopentadienyl)vanadium trichloride.

(iii) 1,2,3-Tri-substituted cyclopentadienyl vanadium trichloride

Examples of 1,2,3-tri-substituted cyclopentadienyl vanadium trichloride include (1,2,3-trimethyl cyclopentadienyl) vanadium trichloride.

(iv) 1,2,4-Tri-substituted cyclopentadienyl vanadium trichloride

Examples of 1,2,4-tri-substituted cyclopentadienyl vanadium trichloride include (1,2,4-trimethyl cyclopentadienyl) vanadium trichloride.

(v) Tetra-substituted cyclopentadienyl vanadium trichloride

Examples of tetra-substituted cyclopentadienyl vanadium trichloride include (1,2,3,4-tetramethyl cyclopentadienyl) vanadium trichloride, and (1,2,3,4-tetraphenylcyclopentadienyl)vanadium trichloride.

(vi) Penta-substituted cyclopentadienyl vanadium trichloride

Examples of penta-substituted cyclopentadienyl vanadium trichloride include (pentamethylcyclopentadienyl) vanadium trichloride, (1,2,3,4-tetramethyl-5-phenylcyclopentadienyl)vanadium trichloride, and 1-methyl-2,3,4,5-tetraphenylcyclopentadienyl)vanadium trichloride.

(vii) Indenyl vanadium trichloride (viii) Substituted indenyl vanadium trichloride Examples of substituted indenyl vanadium trichloride include (2-methylindenyl)vanadium trichloride, and (2-trimethylsilylindenyl)vanadium trichloride.

(ix) Monoalkoxide, dialkoxide and trialkoxide obtained by substituting chlorine atom in the compounds (i) to (viii) by alkoxy group Examples of these groups include cyclopentadienyl vanadium tri(tert-butoxide), cyclopentadienyl vanadium tri(iso-propoxide), cyclopentadienyl vanadium dimethoxychloride, cyclopentadienyl vanadium di(iso-propoxy)chloride, cyclopentadienyl vanadium di(tert-butoxy)chloride, cyclopentadienyl vanadium di(phenoxy)chloride, cyclopentadienyl vanadium iso-propoxy dichloride, cyclopentadienyl vanadium tert-butoxydichloride, and cyclopentadienyl vanadium phenoxydichloride.

(x) Methylated compound obtained by substituting chlorine atom in the compounds (i) to (ix)

(xi) Compounds comprising R's connected to each other with hydrocarbon group or silyl group Examples of these compounds include (t-butylamide) dimethyl ($\eta^5$-cyclopentadienyl) silane vanadium dichloride, (t-butylamide)dimethyl(trimethyl-$\eta^5$-cyclopentadienyl) silane vanadium dichloride, (t-butylamide)dimethyl (tetramethyl-$\eta^5$-cyclopentadienyl)silane vanadium dichloride.

(xii) Dimethylated compounds obtained by substituting chlorine atom in the compounds (xi) by methyl group (xiii) Monoalkoxylated and dialkoxylated compounds obtained by substituting chlorine atom in the compounds (xi) by alkoxy group (xiv) Compounds obtained by substituting monochlorinated compounds (xiii) by methyl group (xv) Amidated compounds obtained by substituting chlorine atom in the compounds (i) to (viii) by amide group Examples of the amidated compounds include cyclopentadienyl(trisdiethylamide)vanadium, cyclopentadienyl(tris-iso-propylamide)vanadium, cyclopentadienyl(tris-n-octylamide)vanadium, cyclopentadienyl(bisdiethylamide)vanadium chloride, cyclopentadienyl(bis-iso-propylamide)vanadium chloride, cyclopentadienyl(bis-n-octylamide)vanadium chloride, cyclopentadienyl(diethylamide)vanadium dichloride, cyclopentadienyl(iso-propylamide)vanadium dichloride, cyclopentadienyl(n-octylamide)vanadium dichloride, (trimethylsilylcyclopentadienyl)(trisdiethylamide)vanadium, (trimethylsilylcyclopentadienyl) (tris-iso-propylamide) vanadium, (trimethylsilylcyclopentadienyl)(tris-n-octylamide) vanadium, (trimethylsilyl cyclopentadienyl) (bisdiethylamide) vanadium chloride, (trimethylsilylcyclopentadienyl) (bis-iso-propylamide) vanadium chloride, (trimethylsilylcyclopentadienyl) (bis-n-octylamide)vanadium chloride, (trimethylsilyl cyclopentadienyl)(diethylamide)vanadium dichloride, (trimethylsilylcyclopentadienyl)(iso-propylidene)vanadium dichloride and (trimethylsilylcyclopentadienyl)(n-octylamide)vanadium dichloride.

(xx) Methylated compounds obtained by substituting chlorine atom in the compounds (xv) by methyl group Specific examples of the compound represented by RM.L$_a$ include cyclopentadienyl(benzene)vanadium, cyclopentadienyl(toluene)vanadium, cyclopentadienyl (xylene)vanadium, cyclopentadienyl(trimethylbenzene) vanadium, cyclopentadienyl(hexamethylbenzene) vanadium, cyclopentadienyl(naphthalene)vanadium, cyclopentadienyl(anthracene)vanadium, cyclopentadienyl (ferrocene)vanadium, methylcyclopentadienyl (benzene) vanadium, 1,3-dimethyl cyclopentadienyl(benzene) vanadium, 1-butyl-3-methyl cyclopentadienyl(benzene) vanadium, tetramethylcyclo pentadienyl(benzene) vanadium, pentamethylcyclopentadienyl(benzene) vanadium, trimethylsilylcyclopentadienyl(benzene) vanadium, 1,2-bis(trimethylsilyl)cyclopentadienyl(benzene) vanadium, 1,3-bis(trimethylsilyl)cyclopentadienyl(benzene) vanadium, indenyl (benzene)vanadium, 2-methylindenyl (benzene)vanadium, 2-trimethylsilylindenyl(benzene) vanadium, fluorenyl(benzene)vanadium, cyclopentadienyl (ethylene)(trimethylphosphine)vanadium, cyclopentadienyl (butadiene)(trimethylphosphine)vanadium, cyclopentadienyl(1,4-diphenylbutadiene) (trimethylphosphine)vanadium, cyclopentadienyl(1,1,4,4-tetraphenylbutadiene)(trimethylphosphine)vanadium, cyclopentadienyl(2,3-dimethylbutadiene) (trimethylphosphine)vanadium, cyclopentadienyl(2,4-hexadiene)(trimethylphosphine)vanadium, cyclopentadienyl tetracarbonyl vanadium, and indenyl tetracarbonyl vanadium.

Specific examples of the compound represented by R$_n$MX$_{2-n}$.L$_a$ wherein n is 1 include those having other σ-connecting ligands hydrogen atom, halogen atoms such as chlorine, bromine and iodine, hydrocarbon groups such as methyl, phenyl, benzyl, neopentyl, trimetylsilyl and bistrimethylsilylmethyl, hydrocarbon oxy groups such as methoxy, ethoxy and iso-propoxy or hydrocarbon amino groups such as dimethylamino, diethylamino, di-iso-propylamino and dioctylamino.

Specific examples of the compound represented by R$_n$MX$_{2-n}$.L$_a$ wherein n is 2 include those having various cycloalkadienyl rings connected to each other with a crosslinking group such as Me$_2$Si, dimethylmethylene, methylphenylmethylene, diphenylmethylene, ethylene and substituted ethylene.

Other examples of ligands which can be incorporated in the compound represented by R$_n$MX$_{2-n}$.L$_a$ include neutral Lewis bases such as olefin, diene, aromatic hydrocarbon, alkyne, amine, amide, phosphine, ether, ketone and ester. Preferred among these ligands are Lewis bases free of active hydrogen.

Specific examples of the compound represented by R$_n$MX$_{2-n}$.L$_a$ wherein n is 1 include chlorocyclopentadienyl (tetrahydrofuran)vanadium, chlorocyclopentadienyl (trimethyphosphine)vanadium, chlorocyclopentadienyl bis (trimethylphosphine)vanadium, chlorocyclopentadienyl (1,2-bisdimethylphosphinoethane)vanadium, chlorocyclopentadienyl(1,2-bisdiphenylphosphinoethane) vanadium, chlorocyclo pentadienyl(triphenylphosphine) vanadium, chlorocyclo pentadienyl(tetrahydrothiophene) vanadium, bromocyclo pentadienyl(tetrahydrofuran) vanadium, iodocyclopentadienyl(tetrahydrofuran)

vanadium, chloro(methylcyclopentadienyl) (tetrahydrofuran)vanadium, chloro(1,3-dimethylcyclo pentadienyl)(tetrahydrofuran)vanadium, chloro(1-butyl-3-methylcyclopentadienyl)(tetrahydrofuran)vanadium, chloro (tetramethylcyclopentadienyl)(tetrahydrofuran)vanadium, chloro(pentamethylcyclopentadiethyl)(tetrahydrofuran) vanadium, chloro(trimethylsilylcyclopentadienyl) (tetrahydrofuran)vanadium, chloro(1,2-bis(trimethylsilyl) cyclopentadienyl)(tetrahydrofuran)vanadium, chloro(1,3-bis(trimethylsilyl)cyclopentadienyl)(tetrahydrofuran) vanadium, chloroindenyl(tetrahydrofuran)vanadium, chloro (2-methylindenyl)(tetrahydrofuran)vanadium, chloro(2-trimethylsilylindenyl)(tetrahydrofuran)vanadium, chlorofluorenyl(tetrahydrofuran)vanadium, dimethylsilyl (cyclopentadienyl)(t-butylamino)vanadium, and dimethylsilyl(tetramethylcyclopentadienyl)(t-butylamino) vanadium.

Specific examples of the compound represented by $R_nMX_{2-n}.L_a$ wherein n is 2 include biscyclopentadienyl vanadium, bis(methylcyclopentadienyl)vanadium, bis(1,2-dimethylcyclo pentadienyl)vanadium, bis(1,3-dimethylcyclopentadienyl)vanadium, bis(1-butyl-3-methylcyclopentadienyl)vanadium, bis (tetramethylcyclopentadienyl)vanadium, bis (pentamethylcyclopentadienyl)vanadium, bis (ethylcyclopentadienyl)vanadium, bis(n-propylcyclopentadienyl)vanadium, bis(i-propylcyclopentadienyl)vanadium, bis(n-butylcyclopentadienyl)vanadium, bis(i-butylcyclopentadienyl)vanadium, bis(sec-butylcyclopentadienyl)vanadium, bis(t-butylcyclopentadienyl)vanadium, bis(1-methoxyethylcyclopentadienyl)vanadium, bis(1-dimethylaminoethylcyclopentadienyl)vanadium, bis(1-diethylaminoethylcyclopentadienyl)vanadium, bis (trimethylsilylcyclopentadienyl)vanadium, bis(1-dimethylphosphinoethylcyclopentadienyl)vanadium, bis(1, 2-bis(trimethylsilyl)cyclopentadienyl)vanadium, bis(1,3-bis (trimethylsilyl)cyclopentadienyl)vanadium, indenyl cyclopentadienyl vanadium, (2-methylindenyl) cyclopentadienyl vanadium, (2-trimethylsilylindenyl) cyclopentadienyl vanadium, bisindenyl vanadium, bisfluorenyl vanadium, indenyl fluorenyl vanadium, cyclopentadienyl fluorenyl vanadium, dimethylsilyl (cyclopentadienyl)(t-butylamino)vanadium, dimethylsilyl (tetramethylcyclopentadienyl)(t-butylamino)vanadium, dimethylsilyl bis(cyclopentadienyl)vanadium, dimethylsilyl bis(indenyl)vanadium, and dimethylsilyl bis(fluorenyl) vanadium.

Specific examples of the compound represented by $R_nMX_{3-n}.L_a$ wherein n is 1 include dichlorinated compounds such as cyclopentadienyl vanadium dichloride, methyl cyclopentadienyl vanadium dichloride, (1,3-dimethyl cyclopentadienyl)vanadium dichloride, (1-methyl-3-butyl cyclopentadienyl)vanadium dichloride, (pentamethylcyclopentadienyl)vanadium dichloride, (trimethylsilylcyclopentadieyl)vanadium dichloride, (1,3-bis(trimethylsilyl)cyclopentadieyl)vanadium dichloride, indenyl vanadium dichloride, (2-methylindenyl)vanadium dichloride, (2-trimethylsilylindenyl)vanadium dichloride and fluorenyl vanadium dichloride, and dimethylated compounds obtained by substituting chlorine atom in these compounds by methyl group.

Further examples of the compound represented by $R_nMX_{3-n}.L_a$ include those wherein R and X are connected to each other with a hydrocarbon or silyl group. Examples of these compounds include amidechloride compounds such as (t-butylamide)dimethyl ($\eta^5$-cyclopentadienyl)silane vanadium chloride and (t-butylamide)dimethyl(tetramethyl-$\eta^5$-cyclopentadienyl)silane vanadium chloride, and methylated compounds obtained by substituting chlorine atom in these compounds by methyl group.

Further examples of the compound represented by $R_nMX_{3-n}.L_a$ include alkoxide compounds such as cyclopentadienyl vanadium dimethoxide, cyclopentadienyl vanadium di(iso-propoxide), cyclopentadienyl vanadium di(tert-butoxide), cyclopentadienyl vanadium diphenoxide, cyclopentadienyl vanadium methoxychloride, cyclopentadienyl vanadium iso-propoxychloride, cyclopentadienyl vanadium tert-butoxychloride and cyclopentadienyl vanadium phenoxychloride, and methylated compounds obtained by substituting chlorine atom in these compounds by methyl group.

Further examples of the compound represented by $R_nMX_{3-n}.L_a$ include bisamide compounds such as (cyclopentadienyl)(bisdiethylamide)vanadium, (cyclopentadienyl)(bis(di-iso-propylamide))vanadium and (cyclopentadienyl)(bis(di-n-octylamide))vanadium.

Further examples of the compound represented by $R_nMX_{3-n}.L_a$ include phosphine complexes such as cyclopentadienyl vanadium dichloride.bistriethylphosphine complex, cyclopentadienyl vanadium dichloride.bistrimethylphosphine complex, (cyclopentadienyl)(bis(di-iso-propylamide))vanadium trimethylphosphine complex and monomethyl cyclopentadienyl vanadium dichloride bistriethylphosphine complex.

Examples of the compound represented by $R_nMX_{3-n}.L_a$ wherein n is 2 include chlorinated compounds such as dicyclopentadienyl vanadium chloride, bis (methylcyclopentadienyl)vanadium chloride, bis(1,3-dimethylcyclopentadienyl)vanadium chloride, bis(1-butyl-3-methylcyclopentadienyl)vanadium chloride, bis (pentamethyl cyclopentadienyl)vanadium chloride, bis (trimethylsilyl cyclopentadienyl)vanadium chloride, bis(1, 3-bis(trimethyl silyl)cyclopentadienyl)vanadium chloride, diindenyl vanadium chloride, bis(2-methylindenyl) vanadium chloride, bis(2-trimethylsilyl indenyl)vanadium chloride and difluorenyl vanadium chloride, and methylated compounds obtained by substituting chlorine atom in these compounds by methyl group.

Further examples of the compound represented by $R_nMX_{3-n}.L_a$ wherein n is 2 include dicyclopentadienyl vanadium methoxide, dicyclopentadienyl vanadium iso-propoxide, dicyclopentadienyl vanadium tert-butoxide, dicyclopentadienyl vanadium phenoxide, dicyclopentadienyl (diethylamide)vanadium, dicyclopentadienyl(di-iso-propylamide)vanadium, and dicyclopentadienyl(di-n-octylamide) vanadium.

Other examples of the compound represented by $R_nMX_{3-n}.L_a$ wherein n is 2 include those wherein R's are connected to each other with a hydrocarbon or silyl group. Examples of these compounds include chlorinated compounds such as dimethylbis($\eta^5$-cyclopentadienyl) silane vanadium chloride and dimethylbis(tetramethyl-$\eta^5$-cyclopentadienyl)silane vanadium chloride, and methylated compounds obtained by substituting chlorine atom in these compounds by methyl group.

Specific examples of the compound represented by $RM(O)X_2$ include cyclopentadienyloxo vanadium dichloride, methyl cyclopentadienyloxo vanadium dichloride, (1,3-dimethylcyclopentadienyl)oxo vanadium dichloride, (1-butyl-3-methylcyclopentadienyl)oxo vanadium dichloride, (pentamethyl cyclopentadienyl)oxo vanadium dichloride, (trimethylsilyl cyclopentadienyl)oxo vanadium dichloride, (1,3-bis(trimethyl silyl)cyclopentadienyl) oxo vanadium dichloride, indenyloxo vanadium dichloride, (2-methylindenyl)oxo vanadium dichloride, (2-trimethylsilylindenyl)oxo vanadium dichloride, and fluorenyloxo vanadium dichloride.

Other examples of the compound represented by RM(O)$X_2$ include dimethylated compounds obtained by substituting chlorine atom in the foregoing compounds by methyl group.

Further examples of the compound represented by RM(O)$X_2$ include those wherein R and X are connected to each other with a hydrocarbon or silyl group. Examples of these compounds include amidechloride compounds such as (t-butylamide) dimethyl ($\eta^5$-cyclopentadienyl) silaneoxo vanadium chloride and (t-butylamide)dimethyl(tetramethyl-$\eta^5$-cyclopentadienyl)silaneoxo vanadium chloride, and methylated compounds obtained by substituting chlorine atom in these compounds by methyl group.

Further examples of these compounds include cyclopentadienyloxo vanadium dimethoxide, cyclopentadienyloxo vanadium di(iso-propoxide), cyclopentadienyloxo vanadium di(tert-butoxide), cyclopentadienyloxo vanadium diphenoxide, cyclopentadienyloxo vanadium methoxychloride, cyclopentadienyloxo vanadium iso-propoxychloride, cyclopentadienyloxo vanadium tert-butoxychloride, and cyclopentadienyloxo vanadium phenoxychloride.

Other examples of these compounds include methylated compounds obtained by substituting chlorine atom in the foregoing various compounds by methyl group.

Examples of these compounds include (cyclopentadienyl)(bisdiethylamide)oxo vanadium, (cyclopentadienyl)(bisdiiso-propylamide)oxo vanadium, and (cyclopentadienyl)(bisdi-n-octylamide)oxo vanadium.

Specific examples of the compound represented by $R_nMX_{3-n}$(NR') include cyclopentadienyl (methylimide) vanadium dichloride, cyclopentadienyl(phenylimide) vanadium dichloride, cyclopentadienyl(2,6-dimethylphenylimide)vanadium dichloride, cyclopentadienyl(2,6-di-iso-propyl phenylimide)vanadium dichloride, (methylcyclopentadienyl)(phenylimide) vanadium dichloride, (1,3-dimethyl cyclopentadienyl) (phenylimide)vanadium dichloride, (1-butyl-3-methylcyclopentadienyl)(phenylimide)vanadium dichloride, (pentamethylcyclopentadienyl)(phenylimide) vanadium dichloride, indenyl(phenylimide)vanadium dichloride, 2-methylindenyl(phenylimide)vanadium dichloride, and fluorenyl(phenylimide)vanadium dichloride.

Other examples of the compound represented by $R_nMX_{3-n}$ (NR') include those wherein R and X are connected to each other with a hydrocarbon or silyl group. Examples of these compounds include amidechloride compounds such as (t-butylamide)dimethyl($\eta^5$-cyclopentadienyl)silane(phenylimide)vanadium chloride and (t-butylamide)dimethyl(tetramethyl-$\eta^5$-cyclopentadienyl)silane(phenylimide)vanadium chloride, and methylated compounds obtained by substituting chlorine atom in these compounds by methyl group.

Further examples of the compound represented by $R_nMX_{3-n}$(NR') include those wherein R's are connected to each other with a hydrocarbon or silyl group. Examples of these compounds include imidechloride compounds such as dimethylbis($\eta^5$-cyclopentadienyl)silane(phenylimide) vanadium chloride, dimethylbis($\eta^5$-cyclopentadienyl)silane (tolylimide)vanadium chloride, dimethylbis(tetramethyl-$\eta^5$-cyclopentadienyl)silane(phenylimide)vanadium chloride and dimethyl(tetramethyl-$\eta^5$-cyclopentadienyl)silane (tolylimide)vanadium chloride, and methylated compounds obtained by substituting chlorine atom in these compounds by methyl group.

Further examples of these compounds include cyclopentadienyl vanadium(phenylimide)dimethoxide, cyclopentadienyl vanadium(phenylimide)di-iso-propoxide, cyclopentadienyl vanadium(phenylimide)(iso-propoxy)chloride, (cyclopentadienyl)(bisdiethylamide)vanadium (phenylimide), and (cyclopentadienyl)(bis-iso-propylamide) vanadium(phenylimide).

Examples of the non-coordinating anion constituting the ionic compound made of a non-coordinating anion and a cation in the component (B) of the present invention include tetra(phenyl)borate, tetra(fluorophenyl)borate, tetrakis (difluorophenyl)borate, tetrakis(trifluorophenyl)borate, tetrakis(tetrafluorophenyl)borate, tetrakis(penta fluorophenyl)borate, tetrakis(tetrafluoromethylphenyl) borate, tetrakis(3,5-bistrifluoromethylphenyl)borate, tetra (tolyl)borate, tetra(xylyl)borate, triphenyl (pentafluorophenyl)borate, tris(pentafluorophenyl)(phenyl) borate, tridecahydride-7,8-dicarbaundecaborate, tetrafluoroborate, and hexafluorophosphate.

On the other hand, examples of the cation constituting the ionic compound made of a non-coordinating anion and a cation in the component (B) of the present invention include carbonium cation, oxonium cation, ammonium cation, phosphonium cation, cycloheptatrienyl cation, and ferrocenium cation containing transition metal.

Specific examples of the carbonium cation include trisubstituted carbonium cations such as triphenyl carbonium cation and tri-substituted phenyl carbonium cation. Specific examples of the tri-substituted phenylcarbonium cation include tri(methylphenyl)carbonium cation, and tris (dimethyl phenyl)carbonium cation.

Specific examples of the ammonium cation include trialkyl ammonium cations such as trimethyl ammonium cation, triethyl ammonium cation, tripropyl ammonium cation, tri(i-butyl)ammonium cation and tri(n-butyl) ammonium cation, N,N-dialkyl anilinium cations such as N,N-dimethyl anilinium cation, N,N-diethyl anilinium cation and N,N-2,4,6-pentamethyl anilinium cation, and dialkyl ammonium cations such as di(i-propyl)ammonium cation and dicyclohexyl ammonium cation.

Specific examples of the phosphonium cation include triaryl phosphonium cations such as triphenyl phosphonium cation, tri(methylphenyl)phosphonium cation and tris (dimethylphenyl)phosphonium cation.

As the foregoing ionic compound there may be preferably used one comprising in combination components arbitrarily selected from the group consisting of the foregoing non-coordinating anions and cations.

Preferred examples of the ionic compound include triphenylcarbonium tetrakis(pentafluorophenyl)borate, triphenylcarbonium tetrakis(3,5-bistrifluoromethylphenyl)borate, triphenylcarbonium tetrakis(fluorophenyl)borate, N,N-dimethylanilinium tetrakis(pentafluorophenyl)borate, N,N-dimethylanilium tetrakis(3,5-bistrifluoromethylphenyl) borate, and 1,1'-dimethylferrocenium tetrakis (pentafluorophenyl)borate.

These ionic compounds may be used singly or in combination of two or more thereof.

Examples of the organic metal compound of element of the group I to III of the Periodic Table as the component (C) of the present invention include organic aluminum compound, organic lithium compound, organic magnesium compound, organic zinc compound, and organic boron compound. The addition of the component (C) exerts an effect of increasing the polymerization activity.

Specific examples of these organic metal compounds include methyl lithium, butyl lithium, phenyl lithium, benzyl lithium, neopentyl lithium, trimethylsilylmethyl lithium, bistrimethylsilylmethyl lithium, dibutyl magnesium, dihexyl magnesium, diethyl zinc, dimethyl zinc, trimethyl aluminum, triethyl aluminum, triisobutyl aluminum, trihexyl aluminum, trioctyl aluminum, tridecyl aluminum, boron trifluoride, and triphenyl boron.

Further examples of these organic metal compounds include organic metal halides such as ethyl magnesium chloride, butyl magnesium chloride, dimethyl aluminum chloride, diethyl aluminum chloride, sesquiethyl aluminum chloride and ethyl aluminum dichloride, and hydrogenated organic metal compounds such as diethyl aluminum hydride and sesquiethyl aluminum hydride.

Preferred among the organic metal compounds of element of the group I to III of the Periodic Table as the component (C) of the present invention is organic aluminum compound.

Specific examples of the organic aluminum compound as the component (C) of the present invention include trialkyl aluminum such as trimethyl aluminum, triethyl aluminum and triisobutyl aluminum, organic aluminum halides such as dimethyl aluminum chloride, diethyl aluminum chloride, sesquiethyl aluminum chloride and ethyl aluminum dichloride, and hydrogenated organic aluminum compounds such as diethyl aluminum hydride and sesquiethyl aluminum hydride.

As the component (C) there may be used an aluminoxane as well. As such an aluminoxane there may be used one obtained by allowing an organic aluminum compound and a condensing agent to come in contact with each other. Examples of the aluminoxane include chain aluminoxane represented by the general formula $(—Al(R')O—)_n$, and cyclic aluminoxane, wherein R' represents a $C_{1-10}$ hydrocarbon group which may be partially substituted by a halogen atom and/or an alkoxy group, and the suffix n represents a polymerization degree of not less than 5, preferably not less than 10. Examples of the $C_{1-10}$ hydrocarbon group represented by R' include methyl group, ethyl group, propyl group, and isobutyl group. Preferred among these $C_{1-10}$ hydrocarbon groups are methyl group and ethyl group. Examples of the raw material of aluminoxane include trialkyl aluminum such as trimethyl aluminum, triethyl aluminum and triisobutyl aluminum, and mixture thereof. A mixture of trimethyl aluminum and tributyl aluminum is preferred as the raw material of aluminoxane.

The foregoing organic aluminum compounds may be used singly or in combination of two or more thereof.

The molar ratio of the metallocene type complex as the component (A) to the ionic compound as the component (B) is preferably from 1:0.1 to 1:10, more preferably from 1:0.2 to 1:5.

The molar ratio of the metallocene type complex as the component (A) to the organic metal compound of element of the group I to III of the Periodic Table as the component (C) is preferably from 1:0.1 to 1:1,000, more preferably from 1:10 to 1:1,000, particularly from 1:10 to 1:500.

The molar ratio of the organic metal compound as the component (C) to water as the component (D) is preferably from 0.66 to 5, more preferably from 0.7 to 1.5, particularly from 0.8 to 1.5.

The order of addition of catalyst components is not specifically limited. In practice, however, the catalyst components may be added in the following order.

1) To the conjugated diene compound monomer to be polymerized or a mixture of the monomer and a solvent is added the component (D). To the mixture is then added the component (C). To the mixture are then added the component (A) and the component (B) in an arbitrary order.

2) To the conjugated diene compound monomer to be polymerized or a mixture of the monomer and a solvent are added the component (D) and the component (C). To the mixture are then added the component (A) and the component (B) in an arbitrary order.

In the foregoing procedure, the conjugated diene compound monomer to be polymerized may be entirely or partially added. If the conjugated diene compound monomer to be polymerized is partially added, the foregoing contact mixture may be mixed with the rest of the monomer or a solution of the rest of the monomer.

Examples of the conjugated diene compound monomer include 1,3-butadiene, isoprene, 1,3-pentadiene, 2-ethyl-1, 3-butadiene, 2,3-dimethylbutadiene, 2-methylpentadiene, 4-methylpentadiene, and 2,4-hexadiene.

Two or more of these conjugated diene compound monomers may be used in combination.

The monomer component may contain an acyclic monoolefin such as ethylene, propylene, butene-1, butene-2, isobutene, pentene-1, 4-methylpentene-1, hexene-1 and octene-1, a cyclic monoolefin such as cyclopentene, cyclohexene and norbornene and/or an aromatic vinyl compound such as styrene and $\alpha$-methylstyrene and a non-conjugated diolefin such as dicyclopentadiene, 5-ethylidene-2-norbornene and 1,5-hexadiene in a small amount.

The polymerization process employable herein is not specifically limited. For example, bulk polymerization, solution polymerization, etc. may be used. Examples of the solvent to be used in solution polymerization include aromatic hydrocarbon such as toluene, benzene and xylene, aliphatic hydrocarbon such as n-hexane, butane, heptane and pentane, alicyclic hydrocarbon such as cyclopentane and cyclohexane, olefinic hydrocarbon such as 1-butene, cis-2-butene and trans-2-butene, hydrocarbon solvent such as mineral spirit, solvent naphtha and kerosine, and halogenated hydrocarbon solvent such as methylene chloride. 1,3-Butadiene may be used as a polymerization solvent itself.

In the present invention, bulk polymerization using a conjugated diene as a polymerization solvent itself, if any, is advantageous in that it requires no great energy to recover the solvent.

If solution polymerization is used in the present invention, toluene, cyclohexane, a mixture of cis-2-butene and trans-2-butene or the like is preferably used as a solvent.

In the present invention, the conjugated diene compound may be polymerized in the presence of the foregoing catalyst and hydrogen for modifying the molecular weight of the product.

The amount of hydrogen to be present in the polymerization is preferably not more than 500 mmol or not more than 12 liter at 20° C. and 1 atm., more preferably not more than 50 mmol or not more than 1.2 liter at 20° C. and 1 atm., particularly from 0.005 to 20 mmol or from 0.0001 to 0.48 liter at 20° C. and 1 atm. based on 1 mol of the conjugated diene used.

Hydrogen may be continuously introduced into the polymerization tank.

The polymerization temperature is preferably from −100° C. to 120° C., more preferably from −50° C. to 120° C., particularly from −50° C. to 100° C. The polymerization time is preferably from 2 minutes to 12 hours, more preferably from 10 minutes to 12 hours, even more preferably from 10 minutes to 6 hours, particularly from 30 minutes to 6 hours.

The material to be polymerized is subjected to polymerization for a predetermined period of time. If necessary, a stopper such as alcohol is then added to terminate the polymerization. If necessary, the pressure in the polymerization tank is relaxed. The product is then subjected to post-treatment such as washing and drying.

The use of the polymerization process of the present invention makes it possible to produce a polybutadiene having a 1,2-structure content of from 4 to 30%, preferably from 5 to 25%, more preferably from 5 to 20%, particularly from 7 to 15%, a cis-1, 4-structure content of from 65 to 95%, preferably from 70 to 95%, more preferably from 70 to 92%, and a trans-1,4-structure content of not more than 5%, preferably not more than 4.5%, particularly from 0.5 to 4.0%.

If the microstructure falls outside the above defined range, the resulting polymer leaves something to be desired in reactivity (graft reactivity or crosslinking reactivity). If used as an additive or the like, the polymer gives deteriorated rubber properties, disadvantageously affecting the balance of physical properties and external appearance.

In accordance with the polymerization process of the present invention, a polybutadiene having an intrinsic viscosity [η] of from 0.1 to 20 as determined in toluene at 30° C. can be produced.

Further, the use of the polymerization process of the present invention makes it possible to produce a polybutadiene having a weight-average molecular weight of from 10,000 to 4,000,000 as determined by GPC with polystyrene as a standard substance.

The polybutadiene produced according to the present invention exhibits a Tcp/$ML_{1+4}$ ratio of from 2 to 6, preferably from 2.5 to 5 wherein Tcp is toluene solution viscosity and $ML_{1+4}$ is Mooney viscosity at 100° C.

The toluene solution viscosity (Tcp) of the polybutadiene of the present invention is from 20 to 500, preferably from 30 to 350.

The Moonery viscosity ($ML_{1+4}$) of the polybutadiene of the present invention is from 10 to 200, preferably from 20 to 100.

The molecular weight of the polybutadiene of the present invention is from 0.1 to 10, preferably from 0.1 to 5, as calculated in terms of intrinsic viscosity [η] determined in toluene at 30° C.

These polybutadienes can be preferably used as an impact modifier for polystyrene.

The monomer to be polymerized is preferably allowed to come in contact with the foregoing catalyst components at a temperature of 40° C. for 1 to 60 minutes before polymerization. In other words, the monomer to be polymerized is preferably subjected to prepolymerization at a predetermined temperature in the presence of the foregoing catalyst. The prepolymerization of the present invention can be accomplished by gas phase process, slurry process, bulk process or the like. The solid matter obtained in the prepolymerization process may or may not be separated before the subsequent polymerization.

The prepolymerization time is normally not more than 600 minutes, preferably not more than 120 minutes, more preferably from 30 seconds to 120 minutes. If the prepolymerization time falls outside the above defined range, it is disadvantageous in that the subsequent polymerization is effected at an insufficient activity.

The prepolymerization is effected in the presence of the various catalyst components at a temperature of not higher than 40° C., preferably from −100° C. to 40° C., more preferably from −50° C. to 40° C. If the prepolymerization temperature falls outside the above defined range, the subsequent polymerization is effected at a remarkably lowered activity. Further, polymerization proceeds too far during the prepolymerization, giving a process problem.

During the prepolymerization, hydrogen may be present as necessary. The amount of hydrogen to be present in the polymerization is preferably not more than 500 mmol or not more than 12 liter at 20° C. and 1 atm., more preferably not more than 50 mmol or not more than 1.2 liter at 20° C. and 1 atm., particularly from 0.005 to 20 mmol or from 0.0001 to 0.48 liter at 20° C. and 1 atm. based on 1 mol of the conjugated diene used.

The present invention will be further described in the following examples, but the present invention should not be construed as being limited thereto.

The microstructure of polybutadiene was analyzed by infrared absorption spectroscopy. In some detail, the microstructure of polybutadiene was calculated from the ratio of absorption intensity at 740 $cm^{-1}$ for cis-1,4-structure, 967 $cm^{-1}$ for trans-1,4-structure and 911 $cm^{-1}$ for 1,2-structure (vinyl).

For the evaluation of molecular weight distribution, the ratio of Mw/Mn was determined wherein Mw is weight-average molecular weight determined by GPC with polystyrene as a standard substance and Mn is number-average molecular weight.

The intrinsic viscosity [η] of polybutadiene was determined in toluene solution at 30° C.

Mooney viscosity ($ML_{1+4}$) of the polymer was determined in accordance with JIS K 6300.

Toluene solution viscosity ($T_{cp}$) of the polymer was determined by dissolving 2.28 g of the polymer in 50 ml of toluene, and subjecting the toluene solution of the polymer to the viscosity measurement by a Canon Fenske viscometer No. 400 using a viscometer-correction standard liquid in accordance with JIS Z 8809 at a temperature of 25° C.

EXAMPLES 1 TO 14

Into a 1.5 liter autoclave in which the air within had been replaced by nitrogen was charged 400 ml (248 g) of 1,3-butadiene. The material was then stirred. To the material was then added water ($H_2O$) as set forth in Table 1. The mixture was then stirred for 30 minutes to make a solution. Subsequently, hydrogen gas was introduced into the autoclave in an amount of 200 ml as determined at 20° C. and 1 atm. by an integrating mass flow meter. Subsequently, triethyl aluminum (1 mmol/ml toluene solution) was added to the mixture in an amount as set forth in Table 1. After 3 minutes, 0.8 ml of cylopentadienyl vanadium trichloride ($CpVCl_3$) (0.005 mmol/ml toluene solution) was added to the mixture. 4 ml of triphenylcarbonium tetrakis (pentafluorophenyl)borate ($Ph_3CB(C_6F_5)_4$) (0.0025 mmol/ml toluene solution) was then added to the mixture. The mixture was then subjected to polymerization at a temperature of 40° C. for a period of time set forth in Table 1.

After polymerization, a mixture of equal part of ethanol and heptane containing a small amount of 2,6-di-t-butyl-p-cresol was added to the product. The pressure in the autoclave was then relaxed. The product was poured into ethanol to precipitate a polymer which was then withdrawn by filtration and dried. The results of polymerization are set forth in Tables 2 and 3.

TABLE 1

| Example No. | H₂O (D) (mmol) | TEA (C) (mmol) | TEA/H₂O (C)/(D) | Polymerization time (min.) |
|---|---|---|---|---|
| 1 | 0.12 | 0.28 | 2.33 | 30 |
| 2 | 0.12 | 0.3 | 2.50 | 30 |
| 3 | 0.12 | 0.34 | 2.83 | 30 |
| 4 | 0.12 | 0.36 | 3.00 | 30 |
| 5 | 0.29 | 0.46 | 1.59 | 30 |
| 6 | 0.29 | 0.48 | 1.66 | 25 |
| 7 | 0.29 | 0.5 | 1.72 | 30 |
| 8 | 0.29 | 0.54 | 1.86 | 30 |
| 9 | 0.4 | 0.6 | 1.50 | 25 |
| 10 | 0.4 | 0.66 | 1.65 | 30 |
| 11 | 0.4 | 0.74 | 1.85 | 30 |
| 12 | 0.68 | 0.82 | 1.21 | 30 |
| 13 | 0.68 | 0.84 | 1.24 | 30 |
| 14 | 0.68 | 0.86 | 1.26 | 30 |

TABLE 2

| Example No. | Yield (g) | Polymerization activity (g/mmol.V.h) |
|---|---|---|
| 1 | 37.8 | 18,900 |
| 2 | 62.9 | 31,450 |
| 3 | 50.1 | 25,050 |
| 4 | 33.0 | 16,500 |
| 5 | 24.0 | 12,000 |
| 6 | 75.9 | 45,540 |
| 7 | 53.6 | 26,800 |
| 8 | 44.5 | 22,250 |
| 9 | 74.7 | 44,820 |
| 10 | 69.4 | 34,700 |
| 11 | 59.5 | 29,750 |
| 12 | 46.1 | 23,050 |
| 13 | 64.5 | 32,250 |
| 14 | 58.5 | 29,250 |

TABLE 3

| Example No. | [η] | Microstructure (%) | | |
|---|---|---|---|---|
| | | Cis | Trans | 1,2- |
| 1 | 2.05 | 88.0 | 0.8 | 11.2 |
| 2 | 2.23 | 88.1 | 0.8 | 11.1 |
| 3 | 2.03 | 88.0 | 0.8 | 11.2 |
| 4 | 1.70 | 88.1 | 0.7 | 11.2 |
| 5 | 2.12 | 88.1 | 0.7 | 11.2 |
| 6 | 2.51 | 87.8 | 0.8 | 11.4 |
| 7 | 2.00 | 88.0 | 0.8 | 11.2 |
| 8 | 1.80 | 88.0 | 0.8 | 11.2 |
| 9 | 2.46 | 88.6 | 0.6 | 10.8 |
| 10 | 2.24 | 88.6 | 0.6 | 10.8 |
| 11 | 2.10 | 88.4 | 0.8 | 10.8 |
| 12 | 2.00 | 88.2 | 0.6 | 11.2 |
| 13 | 2.21 | 88.0 | 0.6 | 11.4 |
| 14 | 2.15 | 87.8 | 0.8 | 11.4 |

EXAMPLES 15 TO 18

Into a 1.5 liter autoclave in which the air within had been replaced by nitrogen were charged 300 ml of toluene, 400 ml of cis-2-butene and 300 ml (186 g) of 1,3-butadiene. The mixture was then stirred. To the mixture was then added water ($H_2O$) as set forth in Table 4. The mixture was then stirred for 30 minutes to make a solution. Subsequently, hydrogen gas was introduced into the autoclave in an amount of 130 ml as determined at 20° C. and 1 atm. by an integrating mass flow meter. Subsequently, triethyl aluminum (1 mmol/ml toluene solution) was added to the mixture in an amount as set forth in Table 4. After 3 minutes, 1.6 ml of cylopentadienyl(benzene)vanadium ($CpV(C_6H_6)$) (0.005 mmol/ml toluene solution) was added to the mixture. 6.4 ml of triphenylcarbonium tetrakis(pentafluorophenyl)borate ($Ph_3CB(C_6F_5)_4$) (0.0025 mmol/ml toluene solution) was then added to the mixture. The mixture was then subjected to polymerization at a temperature of 60° C. for 30 minute.

After polymerization, a mixture of equal part of ethanol and heptane containing a small amount of 2,6-di-t-butyl-p-cresol was added to the product. The pressure in the autoclave was then relaxed. The product was poured into ethanol to precipitate a polymer which was then withdrawn by filtration and dried. The results of polymerization are set forth in Tables 5 and 6.

TABLE 4

| Example No. | H₂O (D) (mmol) | TEA (C) (mmol) | TEA/H₂O (C)/(D) | Polymerization time (min.) |
|---|---|---|---|---|
| 15 | 1.0 | 2.0 | 2.0 | 30 |
| 16 | 1.3 | 2.0 | 1.5 | 30 |
| 17 | 1.6 | 2.0 | 1.3 | 30 |
| 18 | 1.5 | 3.0 | 2.0 | 30 |

TABLE 5

| Example No. | Yield (g) |
|---|---|
| 15 | 52.5 |
| 16 | 46.7 |
| 17 | 38.4 |
| 18 | 47.9 |

TABLE 6

| Example No. | [η] | Microstructure (%) | | |
|---|---|---|---|---|
| | | Cis | Trans | 1,2- |
| 15 | 1.62 | 87.9 | 1.4 | 10.7 |
| 16 | 1.54 | 88.0 | 1.3 | 10.7 |
| 17 | 1.38 | 87.7 | 1.4 | 10.9 |
| 18 | 1.52 | 88.0 | 1.3 | 10.7 |

REFERENCE EXAMPLES 1 TO 5

Firstly, the amount of water content present in a 1.5 liter autoclave (hereinafter referred to as "base water content") was measured in accordance with the following procedure.

Measurement Procedure

Into a 1.5 liter autoclave in which the air within had been replaced by nitrogen was charged 1.0 liter of 1,3-butadiene through a molecular sieve. The material was then stirred. Subsequently, water was added to the material as set forth in Table 7. The mixture was then stirred for 30 minutes to make a solution. The solution was then measured for water content by means of a Karl Fischer moisture meter. The results of water content in butadiene are set forth in Table 7.

The same procedure as used above was then effected with different amounts of water added five times in total. The base water content was then calculated from the difference between the foregoing water content in butadiene and the added amount of water averaged over five times. As a result, the base water content was 4 mg. This value was taken into account to calculate TEA/H$_2$O ratio in the following examples.

EXAMPLES 19 TO 23

Into a 1.5 liter autoclave in which the air within had been replaced by nitrogen was charged 1.0 liter of 1,3-butadiene through a molecular sieve. The material was then stirred. To the material was then added water as set forth in Table 8. The mixture was then stirred for 30 minutes to make a solution. Subsequently, hydrogen gas was introduced into the butadiene in an amount of 200 ml as determined at 20° C. and 1 atm. by an integrating mass flow meter. Subsequently, triethyl aluminum (1 mmol/ml toluene solution) was added to the mixture in an amount as set forth in Table 8. After 10 minutes of stirring, 2.5 ml of cylopentadienyl vanadium trichloride (CpVCl$_3$) (0.005 mmol/ml toluene solution) and 10 ml of triphenylcarbonium tetrakis(pentafluorophenyl) borate (Ph$_3$CB(C$_6$F$_5$)$_4$) (0.0025 mmol/ml toluene solution) were added to the mixture in the order as set forth in Table 9. The mixture was then subjected to polymerization at a temperature of 40° C. for 30 minutes.

After polymerization, a mixture of equal part of ethanol and heptane containing a small amount of 2,6-di-t-butyl-p-cresol was added to the product. The pressure in the autoclave was then relaxed. The product was poured into ethanol to precipitate a polymer which was then withdrawn by filtration and dried. The results of polymerization are set forth in Tables 9 and 10.

EXAMPLES 24 TO 28

Into a 1.5 liter autoclave in which the air within had been replaced by nitrogen was charged 1.0 liter of 1,3-butadiene through a molecular sieve. The material was then stirred. Subsequently, hydrogen gas was introduced into the butadiene in an amount of 200 ml as determined at 20° C. and 1 atm. by an integrating mass flow meter. Subsequently, triethyl aluminum (1 mmol/ml toluene solution) was added to the mixture in an amount as set forth in Table 8. The mixture was then stirred for 10 minutes. Water was then added to the mixture with stirring in an amount set forth in Table 8. After 30 minutes of stirring, 2.5 ml of cylopentadienyl vanadium trichloride (CpVCl$_3$) (0.005 mnol/ml toluene solution) and 10 ml of triphenylcarbonium tetrakis (pentafluorophenyl)borate (Ph$_3$CB(C$_6$F$_5$)$_4$) (0.0025 mmol/ml toluene solution) were added to the mixture in the order as set forth in Table 9. The mixture was then subjected to polymerization at a temperature of 40° C. for 30 minutes.

After polymerization, a mixture of equal part of ethanol and heptane containing a small amount of 2,6-di-t-butyl-p-cresol was added to the product. The pressure in the autoclave was then relaxed. The product was poured into ethanol to precipitate a polymer which was then withdrawn by filtration and dried. The results of polymerization are set forth in Tables 9 and 10.

COMPARATIVE EXAMPLES 1 AND 2

The procedure of Examples 19 to 23 was followed to obtain 1 liter of 1,3-butadiene having a controlled 1,3-butadiene content. Hydrogen gas was introduced into the 1,3-butadiene in an amount of 200 ml as determined at 20° C. and 1 atm. by an integrating mass flow meter. Subsequently, 2.5 ml of cyclopentadienyl vanadium trichloride (CpVCl$_3$) (0.005 mmol/ml toluene solution) and 10 ml of triphenylcarbonium tetrakis(pentafluorophenyl)borate (Ph$_3$CB(C$_6$F$_5$)$_4$) (0.0025 mmol/ml toluene solution) were added to the mixture in the order as set forth in Table 9. To the mixture was then added triethyl aluminum (1 mmol/ml toluene solution) in an amount as set forth in Table 8. After 10 minutes of stirring, the mixture was then subjected to polymerization at a temperature of 40° C. for 30 minutes.

After polymerization, a mixture of equal part of ethanol and heptane containing a small amount of 2,6-di-t-butyl-p-cresol was added to the product. The pressure in the autoclave was then relaxed. The product was poured into ethanol to precipitate a polymer which was then withdrawn by filtration and dried. The results of polymerization are set forth in Tables 9 and 10.

COMPARATIVE EXAMPLES 3 AND 4

The procedure of Examples 24 to 28 was followed except that triethyl aluminum (1 mmol/ml toluene solution) was added in an amount as set forth in Table 8. After 10 minutes of stirring, 2.5 ml of cyclopentadienyl vanadium trichloride (CpVCl$_3$) (0.005 mmol/ml toluene solution) and 10 ml of triphenylcarbonium tetrakis(pentafluorophenyl) borate (Ph$_3$CB(C$_6$F$_5$)$_4$) (0.0025 mmol/ml toluene solution) were added to the mixture in the order as set forth in Table 9. Water was then added to the mixture with stirring as set forth in Table 8. After 10 minutes of stirring, the mixture was then subjected to polymerization at a temperature of 40° C. for 30 minutes.

After polymerization, a mixture of equal part of ethanol and heptane containing a small amount of 2,6-di-t-butyl-p-cresol was added to the product. The pressure in the autoclave was then relaxed. The product was poured into ethanol to precipitate a polymer which was then withdrawn by filtration and dried. The results of polymerization are set forth in Tables 9 and 10.

TABLE 7

| | | H$_2$O | |
| --- | --- | --- | --- |
| Reference Example No. | Added water (mg) | Water content in butadiene (ppm) | Base water content (mg) |
| 1 | 10 | 14 | 4 |
| 2 | 20 | 25 | 5 |
| 3 | 30 | 34 | 4 |
| 4 | 40 | 43 | 3 |
| 5 | 50 | 54 | 4 |

TABLE 8

| Example No. | Added water (mg) | Water content in butadiene (ppm) | H₂O (D) (mmol) | TEA (C) (mmol) | TEA/H₂O (C)/(D) (total content in butadiene) | Polymerization time (min.) |
| --- | --- | --- | --- | --- | --- | --- |
| Example 19 | 26 | 30 | 1.66 | 2 | 1.20 | 30 |
| Example 20 | 36 | 40 | 2.22 | 2 | 0.90 | 30 |
| Example 21 | 20 | 24 | 1.33 | 2 | 1.50 | 30 |
| Example 22 | 14 | 18 | 1.00 | 2 | 2.00 | 30 |
| Example 23 | 36 | 40 | 2.22 | 2 | 0.90 | 30 |
| Example 24 | 26 | 30 | 1.66 | 2 | 1.20 | 30 |
| Example 25 | 36 | 40 | 2.22 | 2 | 0.90 | 30 |
| Example 26 | 20 | 24 | 1.33 | 2 | 1.50 | 30 |
| Example 27 | 14 | 18 | 1.00 | 2 | 2.00 | 30 |
| Example 28 | 36 | 40 | 2.22 | 2 | 0.90 | 30 |
| Comparative Example 1 | 20 | 24 | 1.33 | 2 | 1.50 | 30 |
| Comparative Example 2 | 20 | 24 | 1.33 | 2 | 1.50 | 30 |
| Comparative Example 3 | 20 | 24 | 1.33 | 2 | 1.50 | 30 |
| Comparative Example 4 | 20 | 24 | 1.33 | 2 | 1.50 | 30 |

*Base water content: 4 mg

TABLE 9

| Example No. | Order of addition | Yield (g) |
| --- | --- | --- |
| Example 19 | (D) → (C) → (A) → (B) | 168 |
| Example 20 | (D) → (C) → (A) → (B) | 134 |
| Example 21 | (D) → (C) → (A) → (B) | 106 |
| Example 22 | (D) → (C) → (A) → (B) | 88 |
| Example 23 | (D) → (C) → (B) → (A) | 121 |
| Example 24 | (C) → (D) → (A) → (B) | 186 |
| Example 25 | (C) → (D) → (A) → (B) | 152 |
| Example 26 | (C) → (D) → (A) → (B) | 118 |
| Example 27 | (C) → (D) → (A) → (B) | 96 |
| Example 28 | (C) → (D) → (B) → (A) | 138 |
| Comparative Example 1 | (D) → (A) → (B) → (C) | 5 |
| Comparative Example 2 | (D) → (B) → (A) → (C) | 2 |
| Comparative Example 3 | (C) → (A) → (B) → (D) | 4 |
| Comparative Example 4 | (C) → (B) → (A) → (D) | 9 |

TABLE 10

| Example No. | [η] | Microstructure (%) | | |
| --- | --- | --- | --- | --- |
| | | Cis | Trans | 1,2- |
| Example 19 | 2.71 | 87.6 | 1.3 | 11.1 |
| Example 20 | 2.18 | 87.7 | 1.2 | 11.1 |
| Example 21 | 1.85 | 87.7 | 1.2 | 10.9 |
| Example 22 | 1.57 | 87.4 | 1.4 | 11.2 |
| Example 23 | 1.98 | 87.5 | 1.6 | 10.9 |
| Example 24 | 2.96 | 87.2 | 1.4 | 11.4 |
| Example 25 | 2.41 | 87.7 | 1.1 | 11.2 |
| Example 26 | 1.95 | 87.8 | 1.4 | 10.8 |
| Example 27 | 1.71 | 87.5 | 1.3 | 11.2 |
| Example 28 | 2.16 | 87.8 | 1.3 | 10.9 |
| Comparative Example 1 | 0.7 | 87.7 | 1.2 | 11.1 |
| Comparative Example 2 | 0.62 | — | — | — |
| Comparative Example 3 | 0.43 | 87.4 | 1.3 | 11.3 |
| Comparative Example 4 | 0.52 | — | — | — |

EXAMPLES 29 TO 34 AND COMPARATIVE EXAMPLE 5

Into a 1.5 liter autoclave in which the air within had been replaced by nitrogen was charged 1.0 liter of 1,3-butadiene through a molecular sieve. The material was then stirred. Subsequently, water was added to the material as set forth in Table 11. The mixture was then stirred for 30 minutes to make a solution. Hydrogen gas was then introduced into the mixture in an amount of 200 ml as determined at 20° C. and 1 atm. by an integrating mass flow meter. Subsequently, triethyl aluminum (1 mmol/ml toluene solution) was added to the mixture in an amount as set forth in Table 11. The mixture was then stirred for 10 minutes. 1.6 ml of cylopentadienyl vanadium trichloride (CpVCl₃) (0.005 mmol/ml toluene solution) and 6.4 ml of triphenylcarbonium tetrakis (pentafluorophenyl)borate (Ph₃CB(C₆F₅)₄) (0.0025 mmol/ml toluene solution) were added to the mixture in the order as set forth in Table 12. The mixture was then subjected to polymerization at a temperature of 40° C. for 30 minutes.

After polymerization, a mixture of equal part of ethanol and heptane containing a small amount of 2,6-di-t-butyl-p-cresol was added to the product. The pressure in the autoclave was then relaxed. The product was poured into ethanol to precipitate a polymer which was then withdrawn by filtration and dried. The results of polymerization are set forth in Table 12.

COMPARATIVE EXAMPLE 6

The polymerization procedure of Comparative Example 5 was followed except that 2.5 ml of cylopentadienyl vanadium trichloride (CpVCl₃) (0.005 mmol/ml toluene solution) and 10 ml of triphenylcarbonium tetrakis (pentafluorophenyl)borate (Ph₃CB(C₆F₅)₄) (0.0025 mmol/ml toluene solution) were used. The results of polymerization are set forth in Table 12.

COMPARATIVE EXAMPLE 7

The polymerization procedure of Comparative Example 5 was followed except that 5 ml of cylopentadienyl vanadium trichloride (CpVCl₃) (0.005 mmol/ml toluene solution) and 20 ml of triphenylcarbonium tetrakis(pentafluorophenyl) borate (Ph₃CB (C₆F₅)₄) (0.0025 mmol/ml toluene solution) were used. The results of polymerization are set forth in Table 12.

TABLE 11

| Example No. | Added water (mg) | Water content in butadiene (ppm) | $H_2O$ (D) (mmol) | TEA (C) (mmol) | TEA/$H_2O$ (C)/(D) (total content in butadiene) | Polymerization time (min.) |
|---|---|---|---|---|---|---|
| Example 29 | 6 | 10 | 0.55 | 0.45 | 0.81 | 30 |
| Example 30 | 6 | 10 | 0.55 | 0.55 | 0.99 | 30 |
| Example 31 | 6 | 10 | 0.55 | 0.65 | 1.17 | 30 |
| Example 32 | 6 | 10 | 0.55 | 0.75 | 1.35 | 30 |
| Example 33 | 6 | 10 | 0.55 | 1.25 | 2.25 | 30 |
| Example 34 | 6 | 10 | 0.55 | 2 | 3.60 | 30 |
| Comparative Example 5 | 6 | 10 | 0.55 | 3.13 | 5.64 | 30 |
| Comparative Example 6 | 6 | 10 | 0.55 | 3.13 | 5.64 | 30 |
| Comparative Example 7 | 6 | 10 | 0.55 | 3.13 | 5.64 | 30 |

*Base water content: 4 mg

TABLE 12

| Example No. | Order of addition | Yield (g) |
|---|---|---|
| Example 29 | (D) → (C) → (A) → (B) | 108 |
| Example 30 | (D) → (C) → (A) → (B) | 139 |
| Example 31 | (D) → (C) → (A) → (B) | 155 |
| Example 32 | (D) → (C) → (A) → (B) | 79 |
| Example 33 | (D) → (C) → (B) → (A) | 34 |
| Example 34 | (D) → (C) → (A) → (B) | 19 |
| Comparative Example 5 | (D) → (C) → (A) → (B) | 6 |
| Comparative Example 6 | (D) → (C) → (A) → (B) | 28 |
| Comparative Example 7 | (D) → (C) → (A) → (B) | 88 |

REFERENCE EXAMPLES 6 TO 10

Firstly, the amount of water content present in a 1.5 liter autoclave was measured in accordance with the following procedure.

Measurement Procedure

Into a 1.5 liter autoclave in which the air within had been replaced by nitrogen was charged 1.0 liter of a solution of 300 ml of toluene, 400 ml of cis-2-butene and 300 ml (184 g) of 1,3-butadiene through a molecular sieve. The mixture was then stirred. Subsequently, water was added to the mixture as set forth in Table 13. The mixture was then stirred for 30 minutes to make a solution. The solution was then measured for water content by means of a Karl Fischer moisture meter. The results of water content in FB (solvent+butadiene) are set forth in Table 13.

The same procedure as used above was then effected with different amounts of water added five times in total. The base water content was then calculated from the difference between the foregoing water content in FB and the added amount of water averaged over five times. As a result, the base water content was 4 mg. This value was taken into account to calculate TEA/$H_2O$ ratio in the following examples.

EXAMPLES 35 TO 37

Into a 1.5 liter autoclave in which the air within had been replaced by nitrogen was charged 1.0 liter of a solution of 300 ml of toluene, 400 ml of cis-2-butene and 300 ml (184 g) of 1,3-butadiene through a molecular sieve. The material was then stirred. To the material was then added water as set forth in Table 14. The mixture was then stirred for 30 minutes to make a solution. Subsequently, hydrogen gas was introduced into FB (solvent+butadiene) in an amount of 130 ml as determined at 20° C. and 1 atm. by an integrating mass flow meter. Subsequently, triethyl aluminum (1 mmol/ml toluene solution) was added to the mixture in an amount as set forth in Table 14. After 10 minutes of stirring, 1.6 ml of cylopentadienyl vanadium trichloride ($CpVCl_3$) (0.005 mmol/ml toluene solution) and 6.4 ml of triphenylcarbonium tetrakis(pentafluorophenyl)borate ($Ph_3CB(C_6F_5)_4$) (0.0025 mmol/ml toluene solution) were added to the mixture in the order as set forth in Table 15. The mixture was then subjected to polymerization at a temperature of 60° C. for 30 minutes.

After polymerization, a mixture of equal part of ethanol and heptane containing a small amount of 2,6-di-t-butyl-p-cresol was added to the product. The pressure in the autoclave was then relaxed. The product was poured into ethanol to precipitate a polymer which was then withdrawn by filtration and dried. The results of polymerization are set forth in Tables 15 and 16.

EXAMPLES 38 TO 42

Into a 1.5 liter autoclave in which the air within had been replaced by nitrogen was charged 1.0 liter of a solution of 300 ml of toluene, 400 ml of cis-2-butene and 300 ml (184 g) of 1,3-butadiene through a molecular sieve. The material was then stirred. Subsequently, hydrogen gas was introduced into the butadiene in an amount of 130 ml as determined at 20° C. and 1 atm. by an integrating mass flow meter. Subsequently, triethyl aluminum (1 mmol/ml toluene solution) was added to the mixture in an amount as set forth in Table 14. The mixture was then stirred for 10 minutes. Water was then added to the mixture with stirring in an amount set forth in Table 14. After 30 minutes of stirring, 1.6 ml of cylopentadienyl vanadium trichloride ($CpVCl_3$) (0.005 mmol/ml toluene solution) and 6.4 ml of triphenylcarbonium tetrakis(pentafluorophenyl)borate ($Ph_3CB(C_6F_5)_4$) (0.0025 mmol/ml toluene solution) were added to the mixture in the order as set forth in Table 15. The mixture was then subjected to polymerization at a temperature of 60° C. for 30 minutes.

After polymerization, a mixture of equal part of ethanol and heptane containing a small amount of 2,6-di-t-butyl-p-cresol was added to the product. The pressure in the autoclave was then relaxed. The product was poured into ethanol to precipitate a polymer which was then withdrawn by filtration and dried. The results of polymerization are set forth in Tables 15 and 16.

COMPARATIVE EXAMPLE 8

Into a 1.5 liter autoclave in which the air within had been replaced by nitrogen were charged 1.0 liter of a solution of 300 ml of toluene, 400 ml of cis-2-butene and 300 ml (184 g) of 1,3-butadiene. The material was then stirred. Hydrogen gas was then introduced into the autoclave in an amount of 130 ml as determined at 20° C. and 1 atm. by an integrating mass flow meter. Subsequently, triethyl aluminum (1 mmol/ml toluene solution) was added to the mixture in an amount as set forth in Table 15. After 10 minutes of stirring, 1.6 ml of cylopentadienyl vanadium trichloride (CpV(Cl$_3$)) (0.005 mmol/ml toluene solution) was added to the mixture. 6.4 ml of triphenylcarbonium tetrakis(pentafluorophenyl)borate (Ph$_3$CB(C$_6$F$_5$)$_4$) (0.0025 mmol/ml toluene solution) was then added to the mixture. Water was then added to the mixture with stirring as set forth in Table 14. The mixture was then stirred for 30 minutes. The mixture was then subjected to polymerization at a temperature of 60° C. for 30 minute.

TABLE 13

| Reference Example No. | H$_2$O Added water (mg) | Water content in FB (ppm) | Base water content (mg) |
|---|---|---|---|
| 6 | 10 | 14 | 4 |
| 7 | 20 | 25 | 5 |
| 8 | 30 | 34 | 4 |
| 9 | 40 | 43 | 3 |
| 10 | 50 | 54 | 4 |

TABLE 14

| Example No. | H$_2$O Added water (mg) | Water content in FB (ppm) | mmol | TEA (C) mmol | TEA/H$_2$O (C)/(D) (total amount in FB) | Polymerization time (min.) |
|---|---|---|---|---|---|---|
| Example 35 | 20 | 24 | 1.33 | 2 | 1.50 | 30 |
| Example 36 | 14 | 18 | 1.00 | 2 | 2.00 | 30 |
| Example 37 | 20 | 24 | 1.33 | 2 | 1.50 | 30 |
| Example 38 | 20 | 24 | 1.33 | 2 | 1.50 | 30 |
| Example 39 | 14 | 18 | 1.00 | 2 | 2.00 | 30 |
| Example 40 | 10.4 | 14.4 | 0.80 | 2 | 2.50 | 30 |
| Example 41 | 44 | 48 | 2.66 | 4 | 1.50 | 30 |
| Example 42 | 32 | 36 | 2.00 | 4 | 2.00 | 30 |
| Comparative Example 8 | 20 | 24 | 1.33 | 2 | 1.50 | 30 |
| Comparative Example 9 | 20 | 24 | 1.33 | 2 | 1.50 | 30 |
| Comparative Example 10 | 20 | 24 | 1.33 | 2 | 1.50 | 30 |

*Base water content: 4 mg

After polymerization, a mixture of equal part of ethanol and heptane containing a small amount of 2,6-di-t-butyl-p-cresol was added to the product. The pressure in the autoclave was then relaxed. The product was poured into ethanol to precipitate a polymer which was then withdrawn by filtration and dried. The results of polymerization are set forth in Tables 15 and 16.

COMPARATIVE EXAMPLES 9 AND 10

The procedure of Examples 35 to 37 was followed to obtain 1 liter of FB having a controlled water content. Hydrogen gas was then introduced into FB in an amount of 130 ml as determined at 20° C. and 1 atm. by an integrating mass flow meter. Subsequently, 1.6 ml of cyclopentadienyl vanadium trichloride (CpVCl$_3$) (0.005 mmol/ml toluene solution) and 6.4 ml of triphenylcarbonium tetrakis (pentafluorophenyl)borate (Ph$_3$CB(C$_6$F$_5$)$_4$) (0.0025 mmol/ml toluene solution) were added to the mixture in the order as set forth in Table 15. To the mixture was then added triethyl aluminum (1 mmol/ml toluene solution) in an amount as set forth in Table 14. After 10 minutes of stirring, the mixture was then subjected to polymerization at a temperature of 60° C. for 30 minutes.

After polymerization, a mixture of equal part of ethanol and heptane containing a small amount of 2,6-di-t-butyl-p-cresol was added to the product. The pressure in the autoclave was then relaxed. The product was poured into ethanol to precipitate a polymer which was then withdrawn by filtration and dried. The results of polymerization are set forth in Tables 15 and 16.

TABLE 15

| Example No. | Order of addition | Yield (g) |
|---|---|---|
| Example 35 | (D) → (C) → (A) → (B) | 90 |
| Example 36 | (D) → (C) → (A) → (B) | 77 |
| Example 37 | (D) → (C) → (B) → (A) | 40 |
| Example 38 | (C) → (D) → (A) → (B) | 110 |
| Example 39 | (C) → (D) → (A) → (B) | 93 |
| Example 40 | (C) → (D) → (A) → (B) | 79 |
| Example 41 | (C) → (D) → (A) → (B) | 75 |
| Example 42 | (C) → (D) → (A) → (B) | 67 |
| Comparative Example 8 | (C) → (A) → (B) → (D) | 2 |
| Comparative Example 9 | (D) → (B) → (A) → (C) | 4 |
| Comparative Example 10 | (D) → (A) → (B) → (C) | 9 |

TABLE 16

| Example No. | [η] | Microstructure (%) Cis | Trans | 1,2- |
|---|---|---|---|---|
| Example 35 | 2.01 | 87.4 | 1.5 | 11.1 |
| Example 36 | 1.98 | 87.7 | 1.3 | 11 |
| Example 37 | 1.24 | 87.9 | 1.2 | 10.9 |
| Example 38 | 2.89 | 87.7 | 1.4 | 11 |
| Example 39 | 2.35 | 87.7 | 1.3 | 10.9 |
| Example 40 | 1.96 | 87.5 | 1.4 | 11.1 |
| Example 41 | 1.98 | 87.7 | 1.3 | 11 |
| Example 42 | 1.8 | 87.8 | 1.4 | 10.8 |
| Comparative | 0.74 | 87.6 | 1.2 | 11.2 |

TABLE 16-continued

| Example No. | [η] | Microstructure (%) | | |
|---|---|---|---|---|
| | | Cis | Trans | 1,2- |
| Example 8 | | | | |
| Comparative Example 9 | 0.88 | 87.6 | 1.1 | 11.3 |
| Comparative Example 10 | 0.98 | 87.3 | 1.4 | 11.3 |

EXAMPLES 43 TO 50 AND COMPARATIVE EXAMPLES 11 TO 14

Into a 1.5 liter autoclave in which the air within had been replaced by nitrogen was charged 1.0 liter of a solution of 300 ml of toluene, 400 ml of cis-2-butene and 300 ml (184 g) of 1,3-butadiene through a molecular sieve. The material was then stirred. Subsequently, to the mixture was added water as set forth in Table 17. The mixture was then stirred for 30 minutes. Hydrogen gas was then introduced into FB (solvent+butadiene) in an amount of 130 ml as determined at 20° C. and 1 atm. by an integrating mass flow meter. Subsequently, triethyl aluminum (1 mmol/ml toluene solution) was added to the mixture in an amount as set forth in Table 17. The mixture was then stirred for 10 minutes. After 10 minutes of stirring, 1.6 ml of cylopentadienyl vanadium trichloride (CpVCl$_3$) (0.005 mmol/ml toluene solution) and 6.4 ml of triphenylcarbonium tetrakis (pentafluorophenyl)borate (Ph$_3$CB(C$_6$F$_5$)$_4$) (0.0025 mmol/ml toluene solution) were added to the mixture in the order as set forth in Table 18. The mixture was then subjected to polymerization at a temperature of 60° C. for 30 minutes.

After polymerization, a mixture of equal part of ethanol and heptane containing a small amount of 2,6-di-t-butyl-p-cresol was added to the product. The pressure in the autoclave was then relaxed. The product was poured into ethanol to precipitate a polymer which was then withdrawn by filtration and dried.

The results of polymerization are set forth in Tables 18 and 19.

EXAMPLES 51 TO 54 AND COMPARATIVE EXAMPLE 15

Into a 1.5 liter autoclave in which the air within had been replaced by nitrogen was charged 1.0 liter of a solution of 300 ml of toluene, 400 ml of cis-2-butene and 300 ml (184 g) of 1,3-butadiene through a molecular sieve. The material was then stirred. Hydrogen gas was then introduced into the material in an amount of 130 ml as determined at 20° C. and 1 atm. by an integrating mass flow meter. Subsequently, triethyl aluminum (1 mmol/ml toluene solution) was added to the mixture in an amount as set forth in Table 17. The mixture was then stirred for 10 minutes. Water was then added to the mixture with stirring in an amount set forth in Table 17. After 30 minutes of stirring, 1.6 ml of cylopentadienyl vanadium trichloride (CpVCl$_3$) (0.005 mmol/ml toluene solution) and 6.4 ml of triphenylcarbonium tetrakis (pentafluorophenyl)borate (Ph$_3$CB(C$_6$F$_5$)$_4$) (0.0025 mmol/ml toluene solution) were added to the mixture in the order as set forth in Table 18. The mixture was then subjected to polymerization at a temperature of 60° C. for 30 minutes.

After polymerization, a mixture of equal part of ethanol and heptane containing a small amount of 2,6-di-t-butyl-p-cresol was added to the product. The pressure in the autoclave was then relaxed. The product was poured into ethanol to precipitate a polymer which was then withdrawn by filtration and dried.

The results of polymerization are set forth in Tables 18 and 19.

TABLE 17

| Example No. | H$_2$O (D) | | | TEA (C) (mmol) | TEA/H$_2$O (C)/(D) (total amount in FB) | Polymerization time (min.) |
|---|---|---|---|---|---|---|
| | Added water (mg) | Water content in FB (ppm) | mmol | | | |
| Example 43 | 18 | 22 | 1.22 | 1 | 0.82 | 30 |
| Example 44 | 16 | 20 | 1.11 | 1 | 0.90 | 30 |
| Example 45 | 14 | 18 | 1.00 | 1 | 1.00 | 30 |
| Example 46 | 10 | 14 | 0.78 | 1 | 1.29 | 30 |
| Example 47 | 8 | 12 | 0.67 | 1 | 1.50 | 30 |
| Example 48 | 36 | 40 | 2.22 | 2 | 0.90 | 30 |
| Example 49 | 25 | 29 | 1.61 | 2 | 1.24 | 30 |
| Example 50 | 20 | 24 | 1.33 | 2 | 1.50 | 30 |
| Example 51 | 16 | 20 | 1.11 | 1 | 0.90 | 30 |
| Example 52 | 14 | 18 | 1.00 | 1 | 1.00 | 30 |
| Example 53 | 10 | 14 | 0.78 | 1 | 1.29 | 30 |
| Example 54 | 8 | 12 | 0.67 | 1 | 1.50 | 30 |
| Comparative Example 11 | 4 | 8 | 0.44 | 1 | 2.25 | 30 |
| Comparative Example 12 | 68 | 72 | 4.00 | 2 | 0.50 | 30 |
| Comparative Example 13 | 10.4 | 14.4 | 0.80 | 2 | 2.50 | 30 |
| Comparative Example 14 | 9 | 13 | 0.72 | 2 | 2.77 | 30 |
| Comparative Example 15 | 3.2 | 7.2 | 0.40 | 1 | 2.50 | 30 |

*Base water content: 4 mg

TABLE 18

| Example No. | Order of addition | Yield (g) |
|---|---|---|
| Example 43 | (D) → (C) → (A) → (B) | 89 |
| Example 44 | (D) → (C) → (A) → (B) | 121 |
| Example 45 | (D) → (C) → (A) → (B) | 126 |
| Example 46 | (D) → (C) → (A) → (B) | 107 |
| Example 47 | (D) → (C) → (A) → (B) | 94 |
| Example 48 | (D) → (C) → (A) → (B) | 95 |
| Example 49 | (D) → (C) → (A) → (B) | 101 |

TABLE 18-continued

| Example No. | Order of addition | Yield (g) |
|---|---|---|
| Example 50 | (D) → (C) → (A) → (B) | 88 |
| Example 51 | (C) → (D) → (A) → (B) | 104 |
| Example 52 | (C) → (D) → (A) → (B) | 135 |
| Example 53 | (C) → (D) → (A) → (B) | 126 |
| Example 54 | (C) → (D) → (A) → (B) | 93 |
| Comparative Example 11 | (D) → (C) → (A) → (B) | 30 |
| Comparative Example 12 | (D) → (C) → (A) → (B) | 0 |
| Comparative Example 13 | (D) → (C) → (A) → (B) | 40 |
| Comparative Example 14 | (D) → (C) → (A) → (B) | 36 |
| Comparative Example 15 | (C) → (D) → (A) → (B) | 55 |

TABLE 19

| Example No. | [η] | Microstructure (%) | | | $ML_{1+4}$ | $T_{cp}$ | $T_{cp}/ML_{1+4}$ |
| | | Cis | Trans | 1,2- | | | |
|---|---|---|---|---|---|---|---|
| Example 43 | 2.22 | 87.7 | 1.4 | 10.9 | 30 | 81 | 2.7 |
| Example 44 | 3.53 | 87.8 | 1.4 | 10.8 | | | |
| Example 45 | 3.59 | 87.4 | 1.6 | 11 | | | |
| Example 46 | 2.98 | 87.8 | 1.4 | 10.8 | 68 | 320 | 4.7 |
| Example 47 | 2.3 | 87.6 | 1.3 | 11.1 | 34 | 105 | 3.1 |
| Example 48 | 2.46 | 87.5 | 1.4 | 11.1 | 42 | 140 | 3.3 |
| Example 49 | 2.8 | 87.5 | 1.5 | 11 | 60 | 230 | 3.8 |
| Example 50 | 1.98 | 87.7 | 1.3 | 11 | 22 | 58 | 2.6 |
| Example 51 | 2.99 | 87.5 | 1.5 | 11 | 70 | 330 | 4.7 |
| Example 52 | 3.6 | 87.6 | 1.4 | 11 | | | |
| Example 53 | 2.54 | 87.6 | 1.3 | 11.1 | 43 | 143 | 3.3 |
| Example 54 | 2.32 | 87.7 | 1.5 | 10.8 | 35 | 105 | 3.0 |
| Comparative Example 11 | 0.68 | 87.6 | 1.3 | 11.1 | | | |
| Comparative Example 12 | — | — | — | — | | | |
| Comparative Example 13 | 1.6 | 87.6 | 1.5 | 10.9 | | | |
| Comparative Example 14 | 1.54 | 87.8 | 1.4 | 10.9 | | | |
| Comparative Example 15 | 1.88 | 87.8 | 1.3 | 10.9 | | | |

EXAMPLES 55 TO 57

Into a 2 liter autoclave in which the air within had been replaced by nitrogen were charged 300 ml of cyclohexane, 400 ml of cis-2-butene and 300 ml of butadiene. The mixture was then stirred. Subsequently, water ($H_2O$) was added to the mixture as set forth in Table 20. The mixture was then stirred for 30 minutes. Hydrogen gas was then introduced into the mixture in an amount of 150 ml as determined at 20° C. and 1 atm. by an integrating mass flow meter. Subsequently, 2 ml of a 1.0 mol/l toluene solution of triethyl aluminum (TEA), 1 ml of a 5 mmol/l toluene solution of cylopentadienyl vanadium trichloride ($CpVCl_3$) and 4 ml of a 2.5 mmol/l toluene solution of triphenylcarbonium tetrakis (pentafluorophenyl)borate ($Ph_3CB$ $(C_6F_5)_4$) were added to the mixture in this order. The mixture was then subjected to prepolymerization at room temperature for a predetermined period of time set forth in Table 20. Thereafter, the polymerization tank was heated to a temperature of 60° C. where polymerization was then effected for 30 minutes.

After polymerization, ethanol containing 2,6-di-t-butyl-p-cresol was added to the reaction system to terminate the reaction. The solvent was then evaporated so that the polymer was dried. The results of polymerization are set forth in Table 21.

EXAMPLES 58 TO 60

The polymerization procedure of Examples 55 to 57 was followed except that $CpVCl_3$ and $Ph_3CB(C_6F_5)_4$ were added at the same time. The results of polymerization are set forth in Table 21.

EXAMPLES 61 AND 62

The polymerization procedure of Examples 55 to 57 was followed except that the addition of the catalyst components was effected in the order of $Ph_3CB(C_6F_5)_4$ and $CpVCl_3$. The results of polymerization are set forth in Table 21.

COMPARATIVE EXAMPLES 16 TO 18

The polymerization procedure of Examples 55 to 62 was followed except that the addition of the catalyst components was effected in the order as set forth in Table 20 and the polymerization was effected without any prepolymerization. The results of polymerization are set forth in Table 21.

TABLE 20

| Example No. | TEA mmol | $H_2O$ mmol | TEA/$H_2O$ | Order of addition | Prepolymerization time (min.) |
|---|---|---|---|---|---|
| Example 55 | 2 | 1.33 | 1.50 | Water → TEA → V → B | 1 |
| Example 56 | 2 | 1.33 | 1.50 | Water → TEA → V → B | 5 |
| Example 57 | 2 | 1.33 | 1.50 | Water → TEA → V → B | 20 |
| Example 58 | 2 | 1.33 | 1.50 | Water → TEA → (V, B) | 1 |
| Example 59 | 2 | 1.33 | 1.50 | Water → TEA → (V, B) | 5 |
| Example 60 | 2 | 1.33 | 1.50 | Water → TEA → (V, B) | 20 |
| Example 61 | 2 | 1.33 | 1.50 | Water → TEA → B → V | 1 |
| Example 62 | 2 | 1.33 | 1.50 | Water → TEA → B → V | 5 |
| Comparative Example 16 | 2 | 1.33 | 1.50 | Water → TEA → V → B | 0 |
| Comparative Example 17 | 2 | 1.33 | 1.50 | Water → TEA → (V, B) | 0 |
| Comparative Example 18 | 2 | 1.33 | 1.50 | Water → TEA → B → V | 0 |

TABLE 21

| Example No. | Yield (g) | [η] | Microstructure (%) | | |
| --- | --- | --- | --- | --- | --- |
| | | | Cis | Trans | 1,2- |
| Example 55 | 77 | 2.07 | 88.0 | 1.3 | 10.7 |
| Example 56 | 86 | 2.12 | 88.0 | 1.3 | 10.7 |
| Example 57 | 75 | 1.98 | 88.1 | 1.2 | 10.7 |
| Example 58 | 84 | 2.13 | 88.0 | 1.3 | 10.7 |
| Example 59 | 79 | 2.26 | 88.0 | 1.3 | 10.7 |
| Example 60 | 65 | 2.03 | 88.1 | 1.3 | 10.7 |
| Example 61 | 78 | 2.00 | 87.9 | 1.3 | 10.8 |
| Example 62 | 68 | 1.91 | 87.9 | 1.3 | 10.8 |
| Comparative Example 16 | 56 | 1.86 | 87.9 | 1.2 | 10.9 |
| Comparative Example 17 | 53 | 1.59 | 87.7 | 1.4 | 10.9 |
| Comparative Example 18 | 26 | 1.24 | 87.9 | 1.2 | 10.9 |

As has been mentioned above, the present invention provides a process for the production of a conjugated diene polymer having a controlled microstructure at a high polymerization activity in the presence of a metallocene type complex of compound of transition metal of the group V of the Periodic Table. The present invention also provides a process for the production of a polybutadiene having a microstructure comprising a high cis-structure having 1,2-structure properly incorporated therein and hence little trans-structure at a high activity. The present invention further provides a polybutadiene having a microstructure comprising a high cis-structure having 1,2-structure properly incorporated therein and hence little trans-structure and a high linearity.

While the invention has been described in detail and with reference to specific embodiments thereof, it will be apparent to one skilled in the art that various changes and modifications can be made therein without departing from the spirit and scope thereof.

What is claimed is:

1. A process for the preparation of a conjugated diene polymer, which comprises polymerizing a conjugated diene compound in the presence of a catalyst comprising (A) a metallocene complex of a transition metal of the group V of the Periodic Tablet, (B) an ionic compound of a non-coordinating anion and a cation, (C) an organic metal compound of an element of the groups I to III of the Periodic Table and (D) water, wherein the molar ratio of (C)/(D) is from 0.7:1 to 1.5:1.

2. The process for the preparation of a conjugated diene polymer according to claim 1, wherein said metallocene complex of a transition metal of the group V of the Periodic table (A) is a compound represented by the following general formula:

$$RMX_3 \cdot L_a$$

wherein R represents a cyclopentadienyl group, a substituted cyclopentadienyl group, an indenyl group, a substituted indenyl group, a fluorenyl group or a substituted fluorenyl group; M represents a compound of the group V transition metal; X represents a hydrogen atom, a halogen atom, a $C_{1-20}$ hydrocarbon group, an alkoxyl group or an amino group; L represents a Lewis base; and a represents 0, 1 or 2.

3. The process for the preparation of a conjugated diene polymer according to claim 1, wherein said metallocene complex of a transition metal of the group V of the Periodic table (A) is a compound represented by the following general formula:

$$RM \cdot L_a$$

wherein R represents a cyclopentadienyl group, a substituted cyclopentadienyl group, an indenyl group, a substituted indenyl group, a fluorenyl group or a substituted fluorenyl group; M represents a compound of the group V transition metal; L represents a Lewis base; and a represents 0, 1 or 2.

4. The process for the preparation of a conjugated diene polymer according to claim 1, wherein said transition metal of the group V of the Periodic table is vanadium.

5. The process for the preparation of a conjugated diene polymer according to claim 1, wherein said element of the groups I to III of the Periodic table is aluminum.

6. The process for the preparation of a conjugated diene polymer according to claim 1, wherein the polymerization of a conjugated diene compound is effected in the presence of hydrogen.

7. The process for the preparation of a conjugated diene polymer according to claim 1, wherein the polymerization of a conjugated diene compound is carried out by bulk polymerization.

8. The process for the preparation of a conjugated diene polymer according to claim 1, wherein the polymerization of a conjugated diene compound is effected in an aromatic compound as a solvent.

9. The process for the preparation of a conjugated diene polymer according to claim 1, wherein the polymerization of a conjugated diene compound is effected in an aliphatic compound as a solvent.

10. The process for the preparation of a conjugated diene polymer according to claim 1, wherein the polymerization of a conjugated diene compound is effected in 2-butene as a solvent.

11. The process for the preparation of a conjugated diene polymer according to claim 1, wherein said conjugated diene compound is a conjugated diene compound mainly composed of butadiene.

12. The process for the preparation of a conjugated diene polymer acc rding to claim 1, wherein said organic metal compound of the groups I to III of the Periodic table (C) and said water (D) have previously been allowed to come in contact with e ch other.

13. The process for the preparation of a conjugated diene polymer according to claim 1, wherein the polymerization is preceded by the contact with a catalyst component at a temperature of not higher than 40° C. for 1 to 60 minutes.

14. The process for the preparation of a conjugated diene polymer according to claim 1, wherein within 30 minutes after contacting (C) said organic metal compound of the groups I to III of the periodic table with (D) said water, other catalyst components are added to the mixture.

15. The process for the preparation of a conjugated diene polymer according to claim 1, wherein the organic metal compound is selected from the group consisting of triethyl aluminum and triisobutyl aluminum.

* * * * *